(12) United States Patent
Kang

(10) Patent No.: US 9,341,861 B2
(45) Date of Patent: May 17, 2016

(54) MOBILE TERMINAL AND CONTROLLING METHOD THEREOF

(71) Applicant: LG Electronics Inc., Seoul (KR)

(72) Inventor: Kyunghee Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/328,622

(22) Filed: Jul. 10, 2014

(65) Prior Publication Data

US 2015/0198781 A1 Jul. 16, 2015

(30) Foreign Application Priority Data

Jan. 13, 2014 (KR) ........................ 10-2014-0003862

(51) Int. Cl.
| | |
|---|---|
| *G02B 13/16* | (2006.01) |
| *H04N 5/225* | (2006.01) |
| *G02B 27/64* | (2006.01) |
| *G02B 7/08* | (2006.01) |
| *G03B 5/00* | (2006.01) |
| *H04N 5/232* | (2006.01) |
| *G03B 29/00* | (2006.01) |

(52) U.S. Cl.
CPC ................ *G02B 27/646* (2013.01); *G02B 7/08* (2013.01); *G03B 5/00* (2013.01); *H04N 5/2258* (2013.01); *H04N 5/23248* (2013.01); *H04N 5/23251* (2013.01); *H04N 5/23287* (2013.01); *H04N 5/23296* (2013.01); *G03B 29/00* (2013.01); *G03B 2205/0015* (2013.01); *H04M 2250/52* (2013.01)

(58) Field of Classification Search
CPC ........ G02B 7/023; G02B 7/04; G02B 27/646; H04N 5/23212; H04N 5/23216
USPC ............ 348/335, 340, 345, 350, 355, 208.99, 348/208.1–208.5
See application file for complete search history.

(56) References Cited

U.S. PATENT DOCUMENTS

| | | | |
|---|---|---|---|
| 9,124,834 B2 * | 9/2015 | Okura ................... | H04N 5/3742 |
| 2005/0117033 A1 * | 6/2005 | Matsui ................... | H04N 5/262 348/239 |
| 2008/0219654 A1 * | 9/2008 | Border ................. | H04N 5/2258 396/89 |
| 2009/0109331 A1 * | 4/2009 | Imai ....................... | G03B 17/04 348/376 |

* cited by examiner

*Primary Examiner* — Yogesh Aggarwal
(74) *Attorney, Agent, or Firm* — KED & Associates, LLP

(57) ABSTRACT

A mobile terminal and controlling method thereof are disclosed, by which fluctuation of a screen can be reduced. The present invention includes a lens, a lens drive unit configured to move the lens along an x-axis and y-axis which are vertical to an optical axis and a z-axis parallel to the optical axis or to rotate the lens centering on the x-axis and the y-axis, an image pickup unit configured to generate a digital signal by detecting a light having passed through the lens, an image processor configured to create a preview image by applying an image processing to the digital signal, a display unit configured to display the preview image, and a controller, if a distance between the lens and the image pickup unit is shorter than a preset distance, controlling a partial region of the preview image to be outputted through the display unit.

11 Claims, 24 Drawing Sheets

FIG. 1
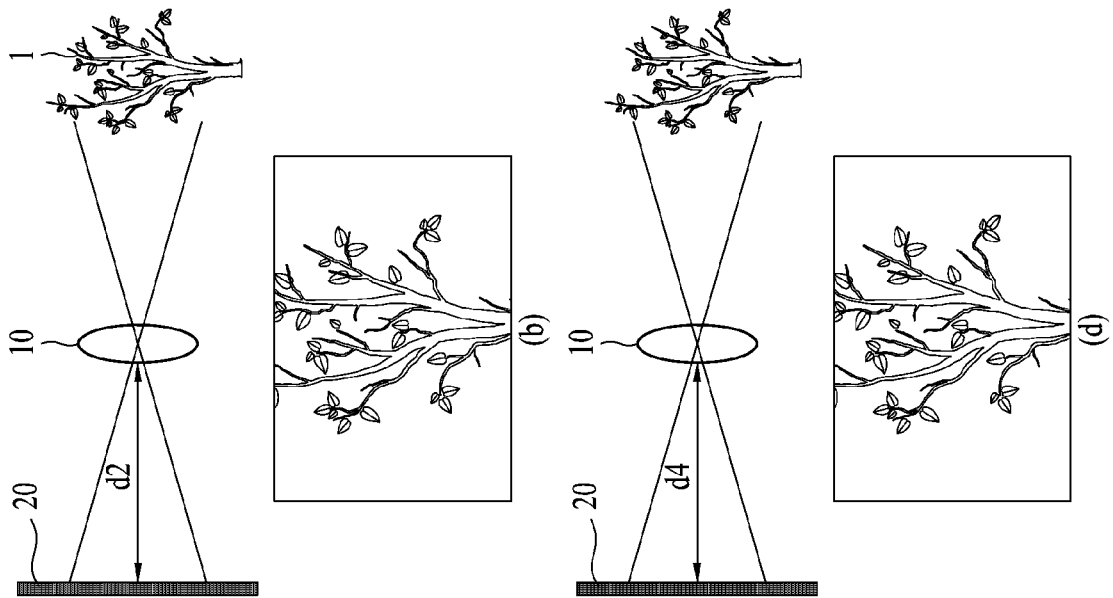
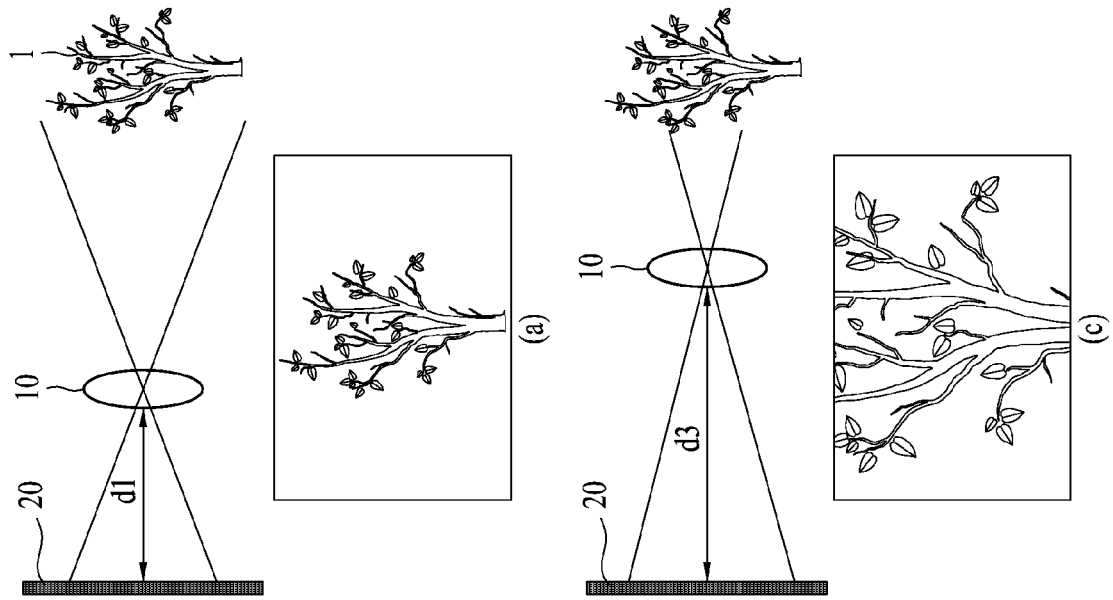

FIG. 7
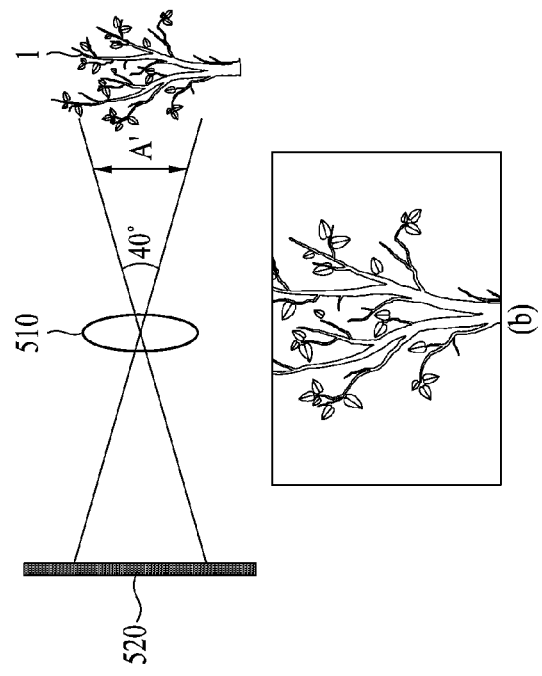
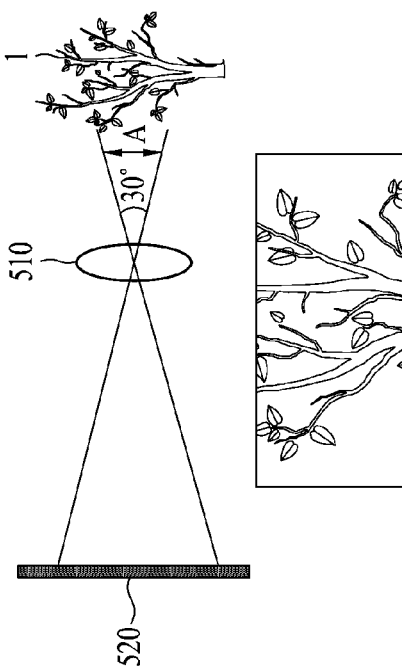
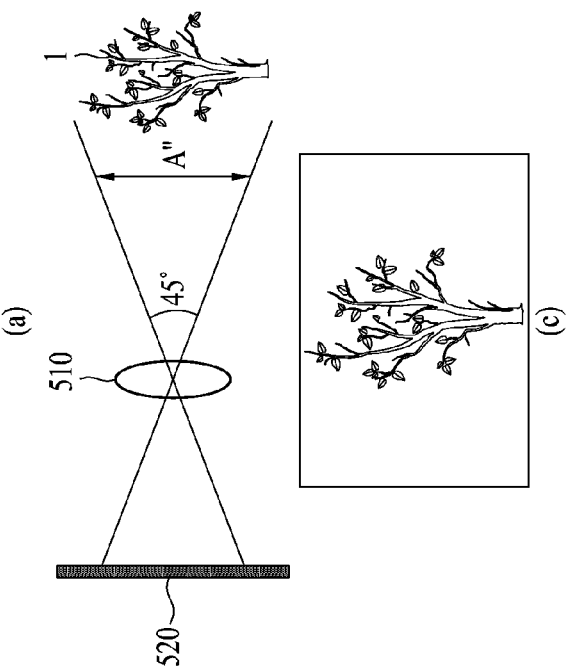

FIG. 10
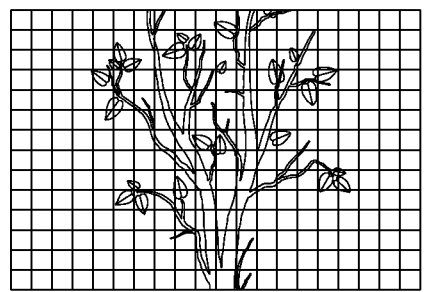
Perform A/D conversion on partial pixels only
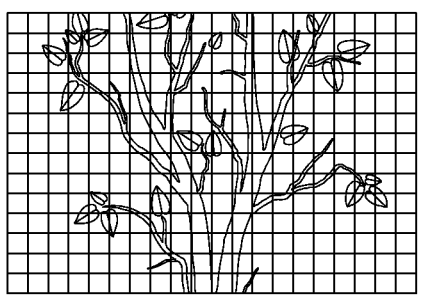
(a)
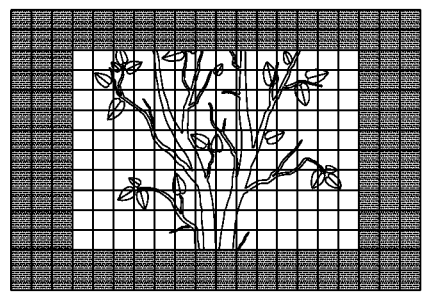
(b)

FIG. 12
(a)
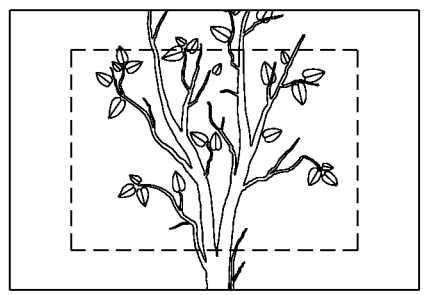
⬇ Display partial region of preview image only
(b)

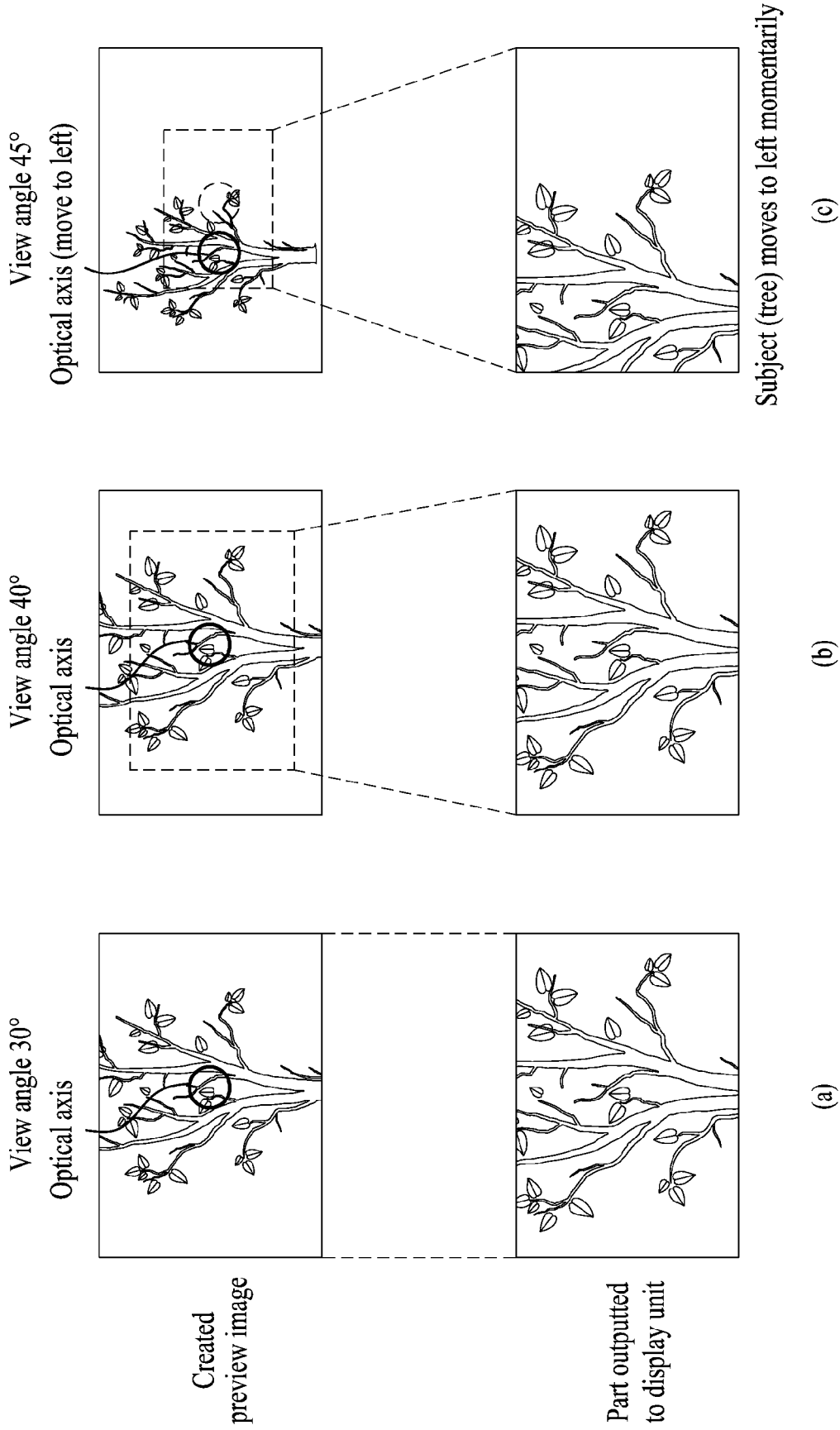

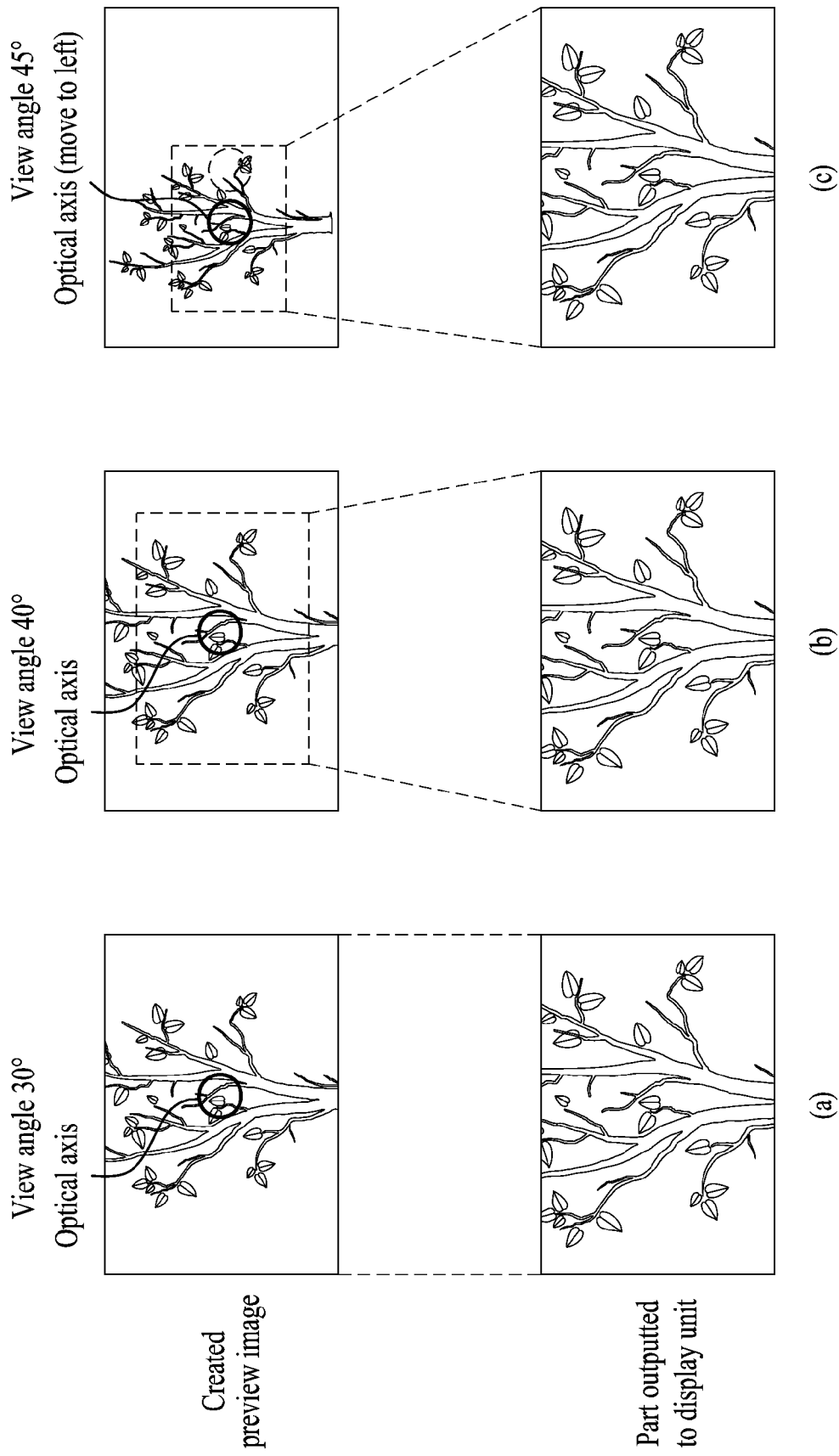

FIG. 20
| Focal distance | Coordinates |
|---|---|
| 50mm | (x1, y1), (x'1,y'1) |
| 55mm | (x2, y2), (x'2,y'2) |
| 60mm | (x3, y3), (x'3,y'3) |
| .... | .... |
| 190mm | (x4, y4), (x'4,y'4) |
| 195mm | (x5, y5), (x'5,y'5) |
| 200mm | (x6, y6), (x'6,y'6) |
(a)
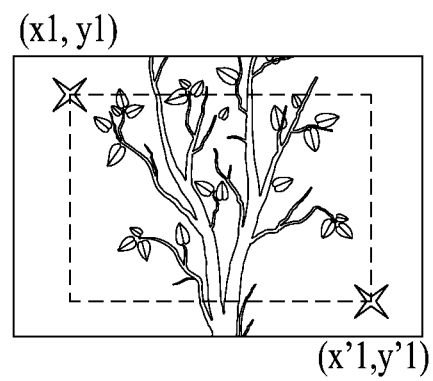
(b)
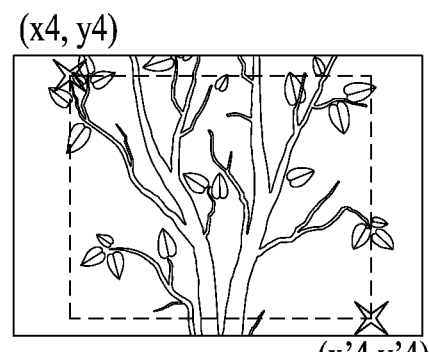
(c)

| Focal distance | Coordinates |
|---|---|
| 50mm | (x1, y1), (x'1,y'1), (x''1,y''1), (x'''1,y'''1) |
| 55mm | (x2, y2), (x'2,y'2), (x''2,y''2), (x'''2,y'''2) |
| 60mm | (x3, y3), (x'3,y'3), (x''3,y''3), (x'''3,y'''3) |
| .... | .... |
| 190mm | (x4, y4), (x'4,y'4), (x''4,y''4), (x'''4,y'''4) |
| 195mm | (x5, y5), (x'5,y'5), (x''5,y''5), (x'''5,y'''5) |
| 200mm | (x6, y6), (x'6,y'6), (x''6,y''6), (x'''6,y'''6) |

(a)

(b)

MOBILE TERMINAL AND CONTROLLING METHOD THEREOF

Pursuant to 35 U.S.C. §119(a), this application claims the benefit of earlier filing date and right of priority to Korean Application No. 10-2014-0003862, filed on Jan. 13, 2014 the contents of which are hereby incorporated by reference herein in its entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for reducing fluctuation of a screen.

2. Discussion of the Related Art

A camera is configured to photograph a subject in a manner of applying an image to an image pickup unit by letting a light enter a lens momentarily. And, applied fields of the camera tend to increasingly expand. It does not come as a surprise that a camera is located on such a mobile terminal as a smartphone, a tablet PC and the like. As cameras are widely used for various purposes, they are currently used for various fields including a security device (e.g., a vehicle black box, a CCTV, etc.) and the like.

In order to obtain a clear photographed image of a subject through a camera, a lens should be focused on a subject in a manner of adjusting a position of the lens. Generally, in order to adjust a position of a lens in a camera, the camera should consist of an image pickup unit, the lens, a lens drive unit for adjusting the position of the lens and a control unit for applying a control signal to the lens drive unit. In particular, the control unit is able to control a focus in a manner of adjusting the position of the lens by applying the control signal to the lens drive unit and placing the lens at a point for maximizing a sharpness of a subject in an image formed on the image pickup unit.

Yet, since a lens should be shifted back and forth in an optical axis direction in order to control a focus, a view angle of the lens keeps changing in the course of focusing. Due to the view angle change of the lens, a size of a subject keeps changing in a screen provided to a user. For instance, when a focus is adjusted by shifting a lens of a camera in an optical axis direction, FIG. 1 is a diagram for one example to describe a process for changing a view angle of the lens and a change of a screen provided to a user in due course. In each of FIGS. 1 (a) to 1 (d), one drawing shown in a top part is a diagram for one example to describe a focal distance between a lens and an image pickup unit 20, while the other drawing in a bottom part is a diagram for one example to describe an image provided to a user.

First of all, referring to FIG. 1 (a), assume that an initial state of a lens is a state in which the lens is spaced apart from the image sensing lens 20 by d1. In the state shown in FIG. 1 (a), in case of attempting to focus on a specific subject 1, a controller measures a sharpness of the subject 1 imaged in an image pickup unit 20 on each movement of a lens while adjusting a distance between the lens and the image pickup unit 20. In particular, the controller is able to measure the sharpness of the subject 1 by moving the lens in an optical axis direction (i.e., an axial direction corresponding to a direction of a light incident through the lens). In particular, if the lens is moved, a distance between the image pickup unit 20 and the lens further increases or decreases.

For instance, the controller can measure the sharpness of the subject 1 by controlling the lens to get away from the image pickup unit 20 gradually. When the lens is spaced apart from the image pickup unit 20 by d2, assume that the sharpness of the subject 1 has a greatest value. On this assumption, if the distance between the lens and the image pickup unit 20 increases to d2 from d1 gradually, the sharpness of the subject 1 will increase gradually. Thereafter, if the distance between the lens and the image pickup unit 20 increases to d3 from d2, since the sharpness of the subject 1 will decrease. Therefore, the controller can determine that the lens is focused on the subject 1 if the distance between the lens and the image pickup unit 20 is d2. In particular, while the controller increases the distance between the lens and the image pickup unit 20 gradually [FIG. 1 (a) FIG. 1 (b) FIG. 1 (c)], if the sharpness of the subject starts to decrease [FIG. 1 (b) FIG. 1 (c)], the controller determines that a focal distance is passed. Therefore, the controller can decrease the distance between the lens and the image pickup unit 20 again [FIG. 1(c) FIG. 1 (d)].

Yet, in case of adjusting a focus on the subject 1 by moving the lens, a view angle of the lens changes continuously. The change of the view angle of the lens enables a photographable rage of a camera to vary gradually. For instance, referring to FIG. 1 (a) and FIG. 1 (b), if the view angle of the lens further decreases, a light can be received for a smaller space. Hence, a size of the subject 1 in a preview image outputted through a display unit can be changed [cf. size changes of a tree shown in FIGS. 1 (a) to 1 (d)]. In particular, a size of the subject 1 in a preview image created from targeting a wide space may be different from a size of the subject 1 in a preview image created from targeting a narrow space. Hence, referring to FIG. 1 (a) to FIG. 1 (d), the size of the subject 1 in an image provided to a user can be momentarily enlarged or reduced.

However, as a size of a subject momentarily increases or decreases, a user may have an impression as if a screen fluctuates. Particularly, if a video file is created by taking a moving object as a subject, since a focus should be adjusted in response to each movement of the object, the screen fluctuation due to the increasing/decreasing size of the subject may be recognized as a serious problem.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which fluctuation of a screen can be reduced.

Another object of the present invention is to provide a mobile terminal and controlling method thereof, by which a size of a subject in an image displayed on a display unit can be maintained equally despite a change of a view angle of a lens.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a lens, a lens drive unit configured to move the lens along an x-axis vertical to an optical axis, a y-axis and a z-axis parallel to the optical axis or to rotate the lens centering on the x-axis and the y-axis, an image pickup unit configured to generate a digital signal by detecting a light having passed through the lens, an image processor configured to create a preview image by applying an image processing to the digital signal, a display unit configured to display the preview image, and a controller, if a distance between the lens and the image pickup unit is shorter than a preset distance, controlling a partial region of the preview image to be outputted through the display unit, wherein if the lens is moved along at least one of the x-axis and the y-axis or rotated centering on at least one of the x-axis and the y-axis, the controller controls a position of the partial region in the preview image to be changed by a displacement of the optical axis attributed to the movement of the lens.

In another aspect of the present invention, a mobile terminal according to another embodiment of the present invention may include a lens, an image pickup unit configured to generate a digital signal by detecting a light having passed through the lens, an image pickup unit drive unit configured to move the image pickup unit along an x-axis vertical to an optical axis, a y-axis and a z-axis parallel to the optical axis or to rotate the image pickup unit centering on the x-axis and the y-axis, an image processor configured to create a preview image by applying an image processing to the digital signal, a display unit configured to display the preview image, and a controller, if a distance between the lens and the image pickup unit is shorter than a preset distance, controlling a partial region of the preview image to be outputted through the display unit, wherein if the image pickup unit is moved along at least one of the x-axis and the y-axis or rotated centering on at least one of the x-axis and the y-axis, the controller controls a position of the partial region in the preview image to be changed by a displacement of the optical axis attributed to the movement of the image pickup unit.

In another aspect of the present invention, a method of controlling a mobile terminal according to another embodiment of the present invention may include the steps of generating a digital signal for an amount of a light having passed through a lens, creating a preview image by applying an image processing to the digital signal, and if a distance between the lens and an image pickup unit is shorter than a preset distance, displaying a partial region of the preview image, wherein if the lens is moved along at least one of an x-axis and a y-axis or rotated centering on at least one of the x-axis and the y-axis, changing a position of the partial region in the preview image by a displacement of the optical axis attributed to the movement of the lens.

In further aspect of the present invention, a method of controlling a mobile terminal according to further embodiment of the present invention may include the steps of generating a digital signal for an amount of a light having passed through a lens, creating a preview image by applying an image processing to the digital signal, and if a distance between the lens and an image pickup unit is shorter than a preset distance, displaying a partial region of the preview image, wherein if the image pickup unit is moved along at least one of an x-axis and a y-axis or rotated centering on at least one of the x-axis and the y-axis, changing a position of the partial region in the preview image by a displacement of the optical axis attributed to the movement of the image pickup unit.

Effects and/or advantages obtainable from the present invention are non-limited by the above mentioned effect. And, other unmentioned effects and/or advantages can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a diagram for one example to describe a process for changing a view angle of a lens and a change of a screen provided to a user in due course, when a focus is adjusted by shifting the lens of a camera in an optical axis direction;

FIG. 7 is a diagram for one example to describe a process for changing a photographable range in response to a change of a focal distance;

FIG. 10 is a diagram to describe one example that A/D conversion is performed only on a portion of a plurality of pixels;

FIG. 12 is a diagram to describe one example of outputting a portion of a preview image through a display unit 151;

FIG. 16 is a diagram for one example of momentarily changing a position of a subject in a preview image in response to a change of an optical axis;

FIG. 19 is a diagram for one example of changing a position of a region desired to be displayed in a preview image in response to a change of an optical axis;

FIG. 20 is a diagram to describe one example of determining an available range using a lookup table;

FIG. 22 is a diagram for one example to describe a rolling shutter generated from CMOS or the like.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals which are able to take a picture. Examples of such terminals include mobile phones, user equipments, smart phones, digital broadcast receivers, personal digital assistants, laptop computers, portable multimedia players (PMP), navigators, digital cameras, compact cameras, mirrorless cameras, hybrid cameras and the like.

Yet, it is apparent to those skilled in the art that a configuration according to an embodiment disclosed in this specification is applicable to such a fixed terminal as a digital TV, a desktop computer and the like as well as a mobile terminal.

Figure 2:
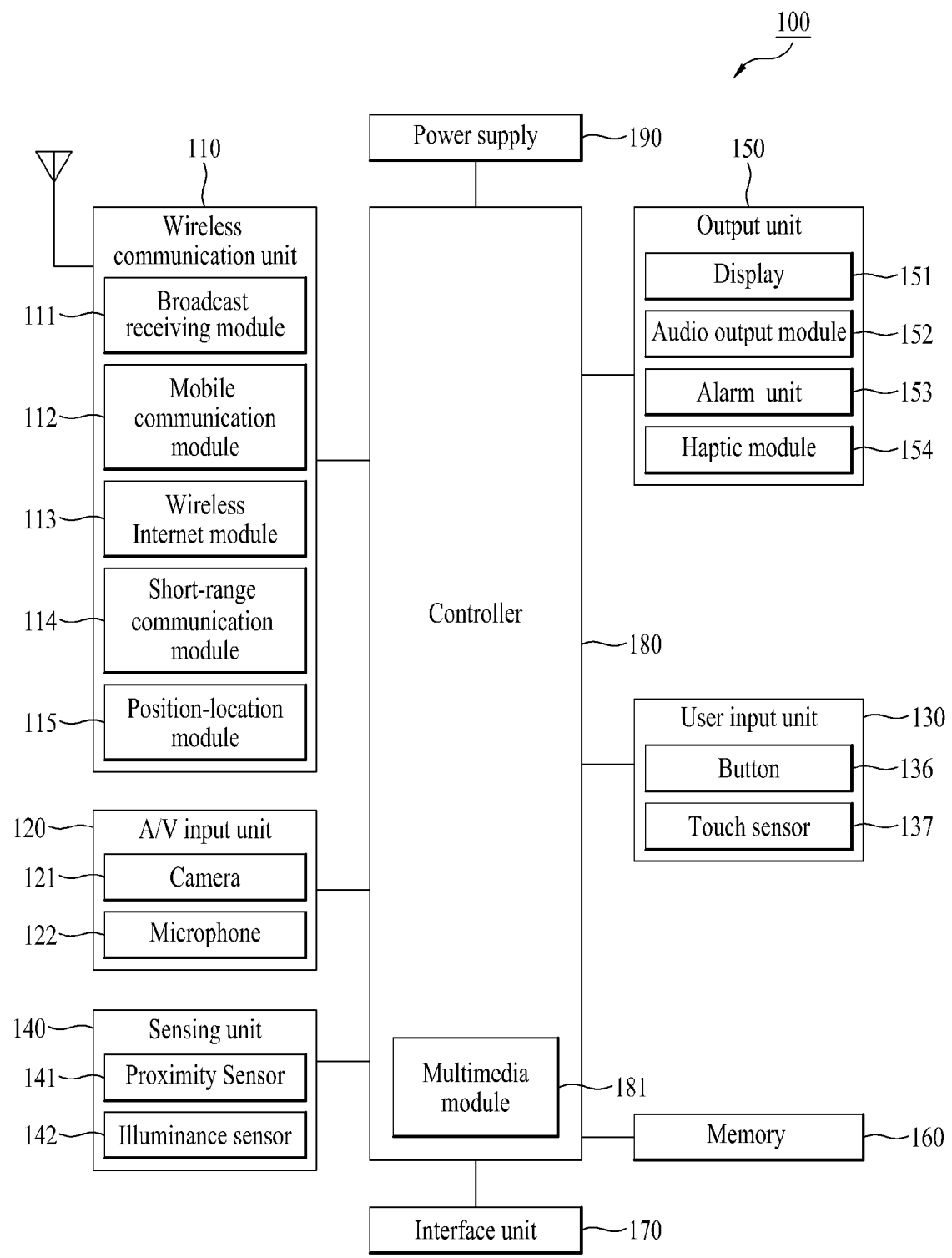
FIG. 2 is a block diagram of a mobile terminal according to one embodiment of the present invention.

FIG. 2 is a block diagram of a mobile terminal 100 in accordance with an embodiment of the present invention. FIG. 2 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 2 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 2, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

A proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 3:
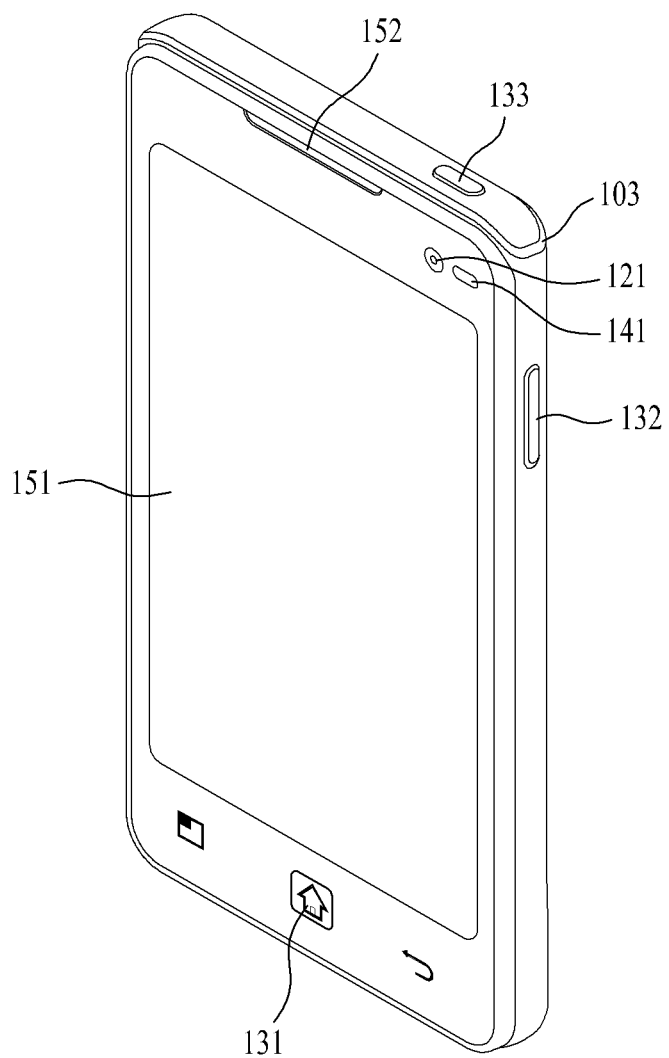
FIG. 3 is a front perspective diagram of a mobile terminal according to one embodiment of the present invention.

FIG. 3 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 3, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 4:
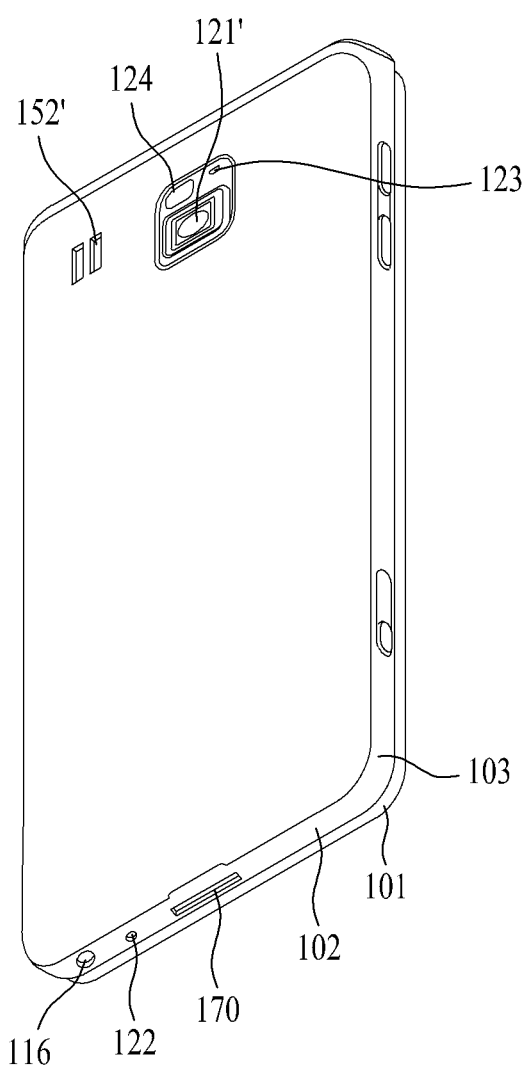
FIG. 4 is a rear perspective diagram of a mobile terminal according to one embodiment of the present invention.

FIG. 4 is a perspective diagram of a backside of the terminal shown in FIG. 3.

Referring to FIG. 4, a camera 121' can be additionally provided to a backside of the terminal body, and more particularly, to the rear case 102. The camera 121 has a photographing direction that is substantially opposite to that of the former camera 121 shown in FIG. 3 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 3 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 2 can be retractably provided to the terminal body.

Figure 5:
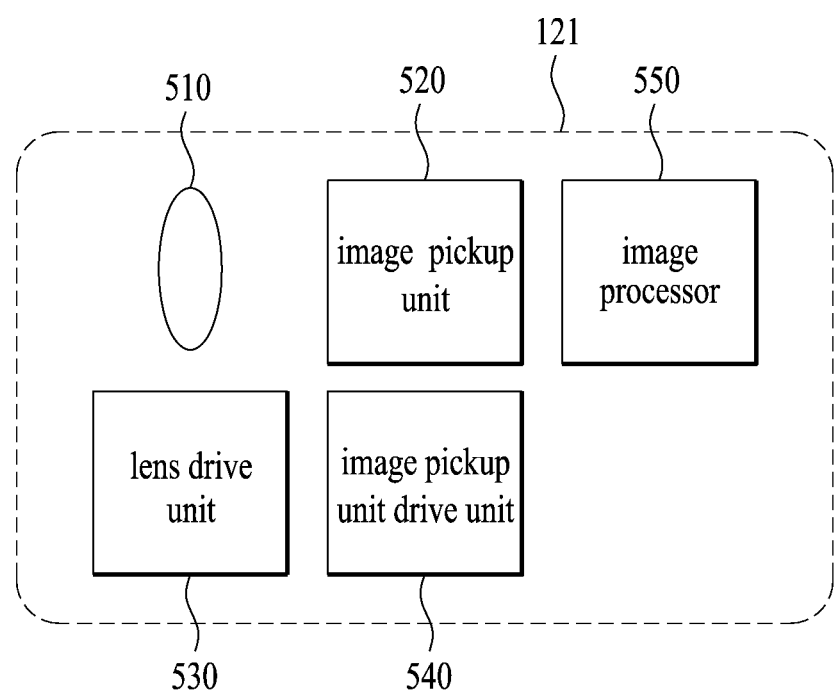
FIG. 5 is a diagram of a configuration of a camera 121 shown in FIG. 2.

FIG. 5 is a diagram of a configuration of a camera 121 shown in FIG. 2.

Referring to FIG. 5, the camera 121 of the mobile terminal 100 may include a lens 510, an image pickup unit 520, a lens drive unit 530, an image pickup unit drive unit 540 and an image processor 550. In the above-enumerated configuration, the camera 121 may include one of the lens drive unit 530 and the image pickup unit drive unit 540 optionally. Alternatively, the camera 121 may include both of the lens drive unit 530 and the image pickup unit drive unit 540.

The lens 510 is configured to collect or release the light radiating from a subject. An externally incident light passes through the lens 510 and then forms an image in the image pickup unit 520.

The image pickup unit 520 detects the light having passed through the lens 510 and is then able to form an image of the detected light. The image pickup unit 520 is able to create a digital signal by converting analog data passing through the lens 510 to digital data. In particular, the image pickup unit 520 is able to create the digital signal by digitalizing a quantity of light received by a plurality of pixels.

The image pickup unit 520 is able to perform an image processing on the digital signal converted by the image pickup unit 520. In particular, the image processor 550 is able to create a preview image, which is to be outputted through the display unit 151, by performing the image processing on the digital signal. If a photographing command is received, the image processor 550 is able to create an image file in format such as tiff, jpeg, yuv, rgb, etc. by applying an image professing algorithm to the digital signal received from the image pickup unit 520. In this case, various kinds of image processing algorithms may apply to the image file creation in accordance with a manufacturer of the camera 121.

The lens drive unit 530 moves the lens 510 based on a control signal of the controller 180. In particular, the lens drive unit 530 can move the lens 510 in an optical axis direction in order to adjust a distance (hereinafter named a focal distance) between the lens 510 and the image pickup unit 520. Moreover, in order to compensate for destabilization of the mobile terminal, the lens drive unit 530 can move the lens 510 in a direction opposite to a moving direction of the mobile terminal or in a direction opposite to a rotational direction of the mobile terminal.

Figure 6:
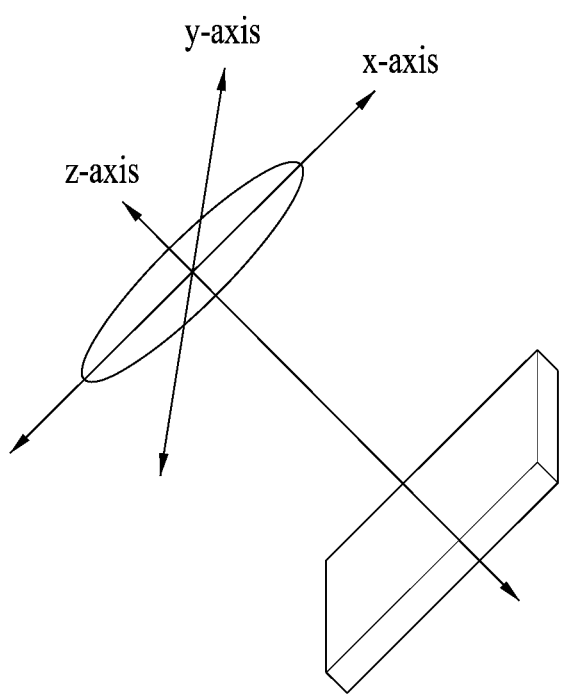
FIG. 6 is a diagram for one example of x-axis, y-axis and z-axis.

The lens drive unit 530 of the present invention may include a connecting unit configured to adjust a position of the lens by being connected to the lens 510 and a signal input unit configured to apply an electric signal to the connecting unit. In particular, the connecting unit may include a z-axis direction connecting unit configured to move the lens 510 along a z-axis, an x-axis direction connecting unit configured to move the lens 510 along an x-axis, and a y-axis direction connecting unit configured to move the lens 510 along a y-axis. In this case, the z-axis means a reference axis in parallel with an optical axis perforating the lens 510 vertically and the x-axis and the y-axis may mean two reference axes configuring a 2-dimensional plane vertical to the optical axis. For instance, FIG. 6 is a diagram for one example of x-axis, y-axis and z-axis. The z-axis direction connecting unit is able to adjust a distance (hereinafter named a focal distance) between the lens 510 and the image pickup unit 520. The x-axis direction connecting unit moves the lens 510 in a direction opposite to an x-axis direction of the mobile terminal in order to compensate for that an image distortion due to the destabilization of the mobile terminal in the x-axis direction. And, the y-axis direction connecting unit moves the lens 510 in a direction opposite to a y-axis direction of the mobile terminal in order to compensate for that an image distortion due to the destabilization of the mobile terminal in the y-axis direction.

The connecting unit may include an x-axis rotation connecting unit configured to rotate the lens 510 centering on the x-axis and a y-axis rotation connecting unit configured to rotate the lens 510 centering on the y-axis. In this case, the x-axis rotation connection unit may be configured to rotate the lens 510 centering on the x-axis, while the y-axis rotation connection unit may be configured to rotate the lens 510 centering on the y-axis. If the mobile terminal is rotated centering on the x-axis or the y-axis, the controller 180 can compensate for the destabilization of the mobile terminal by rotating the lens 510 in a direction opposite to the rotational direction of the mobile terminal.

Each of the connecting units may include at least one of a stepping motor, a piezoelectric device, a VCM (voice-coil motor) and a VCA (voice-coil actuator). In case that the connecting unit includes the stepping motor, the signal input unit applies a drive current to the stepping motor so that the lens 510 can be moved. For instance, the stepping motor of each of the x-axis direction connecting unit, the y-axis direction connecting unit and the z-axis direction connecting unit can control the lens 510 to move along one axis by transforming a rotational motion to a rectilinear motion. And, the x-axis rotation connecting unit can control the lens 510 to rotate centering on the x-axis by transforming a rotational motion of the stepping motor into a curvilinear motion. Moreover, the y-axis rotation connecting unit can control the lens 510 to rotate centering on the y-axis by transforming a rotational motion of the stepping motor into a curvilinear motion.

Instead of moving the lens 510 using the lens drive unit 530, if the image pickup unit 520 is moved, a focal distance can be adjusted or the mobile terminal can be compensated for its destabilization. The image pickup unit drive unit 540 moves the image pickup unit 520 in the optical direction in order to adjust a distance between the lens 510 and the image pickup unit 520. And, the image pickup unit drive unit 540 can move the image pickup unit 520 in a direction opposite to a moving direction of the mobile terminal in order to compensate for the destabilization of the mobile terminal.

The image pickup unit drive unit 540 can include a connecting unit configured to adjust a position of the image pickup unit 520 and a signal input unit configured to apply an electric signal to the connecting unit. The connecting unit may include a z-axis direction connecting unit configured to move the image pickup unit 520 along a z-axis, an x-axis direction connecting unit configured to move the image pickup unit 520 along an x-axis, and a y-axis direction connecting unit configured to move the image pickup unit 520 along a y-axis. In addition, the connecting unit may include an x-axis rotation connecting unit configured to rotate the image pickup unit 520 centering on the x-axis and a y-axis rotation connecting unit configured to rotate the image pickup unit 520 centering on the y-axis.

Each of the connecting units may include at least one of a stepping motor, a piezoelectric device, a VCM (voice-coil motor) and a VCA (voice-coil actuator). In case that the connecting unit includes the stepping motor, the signal input unit applies a drive current to the stepping motor so that the image pickup unit 520 can be moved. For instance, the stepping motor of each of the x-axis direction connecting unit, the y-axis direction connecting unit and the z-axis direction connecting unit can control the image pickup unit 520 to move along one axis by transforming a rotational motion into a rectilinear motion. And, the x-axis rotation connecting unit can control the image pickup unit 520 to rotate centering on the x-axis by transforming a rotational motion of the stepping motor into a curvilinear motion. Moreover, the y-axis rotation connecting unit can control the image pickup unit 520 to rotate centering on the y-axis by transforming a rotational motion of the stepping motor into a curvilinear motion.

The mobile terminal according to the present invention may further include a sensing unit 140, a display unit 151 and a controller 180 as well as the camera 121 shown in FIG. 5.

The sensing unit 140 may include a lens position detecting sensor configured to detect a position of the lens 510, an image pickup unit position detecting sensor configured to detect a position of the image pickup unit 520, and a destabilization detecting sensor configured to detect destabilization of the mobile terminal.

In particular, the lens position detecting sensor can measure a displacement of the lens 510. The lens position detecting sensor may include a z-axis sensor configured to measure a displacement of the lens 510 for z-axis, an x-axis sensor configured to measure a displacement of the lens 510 for x-axis, and a y-axis sensor configured to measure a displacement of the lens 510 for y-axis. In addition, the lens position detecting sensor may further include an x-axis rotation sensor configured to measure a rotating angle of the lens 510 for the x-axis and a y-axis rotation sensor configured to measure a rotating angle of the lens 510 for the y-axis.

The image pickup unit position detecting sensor can measure a displacement of the image pickup unit 520. The image pickup unit position detecting sensor may include a z-axis sensor configured to measure a displacement of the image pickup unit 520 for z-axis, an x-axis sensor configured to measure a displacement of the image pickup unit 520 for x-axis, and a y-axis sensor configured to measure a displacement of the image pickup unit 520 for y-axis. In addition, the image pickup unit position detecting sensor may further include an x-axis rotation sensor configured to measure a rotating angle of the image pickup unit 520 for the x-axis and a y-axis rotation sensor configured to measure a rotating angle of the image pickup unit 520 for the y-axis.

The destabilization detecting sensor is able to detect a motion of the mobile terminal. In particular, the destabilization detecting sensor can measure a displacement of the mobile terminal for an x-axis direction and a displacement of the mobile terminal for a y-axis direction. Moreover, the destabilization detecting sensor may be able to measure a rotating angle of the mobile terminal for the x-axis direction and a rotating angle of the mobile terminal for the y-axis direction. And, the destabilization detecting sensor may include an acceleration sensor, a gyro sensor and the like.

Based on a sensing signal of the sensing unit 140, the controller 180 can compensate image distortion due to destabilization of the mobile terminal. In particular, if the controller 180 determines that the mobile has moved on x-axis and y-axis by 'a' and 'b', respectively, the controller 180 can compensate for the destabilization of the mobile terminal by controlling the lens 510 or the image pickup unit 520 to move on the x-axis and the y-axis by '−a' and '−b', respectively. Moreover, if the controller 180 determines that the mobile has rotated on x-axis and y-axis by 'c' and 'd', respectively, the controller 180 can compensate for the destabilization of the mobile terminal by controlling the lens 510 or the image pickup unit 520 to rotate on the x-axis and the y-axis by '−c' and '−d', respectively.

When a photo is taken, in order to focus on a specific subject, the controller 180 measures a sharpness of the subject by varying a focal distance and then maintains a specific focal distance having a maximum sharpness of the subject. In doing so, as the focal distance changes, a view angle of the lens 510 may change. In general, if a distance (i.e., focal distance) between the lens 510 and the image pickup unit 520 decreases, the view angle of the lens 510 increases. If the view angle of the lens 510 increases, a range available for photographing (hereinafter, such a range shall be named a photographable range) increases. Hence, in order to focus on a specific subject, the photographable range can be extended or reduced in the course of changing the focal distance.

For instance, FIG. 7 is a diagram for one example to describe a process for changing a photographable range in response to a change of a focal distance. Referring to FIGS. 7 (*a*) to 7 (*c*), if a focal distance decreases, a view angle of a lens 510 increases. In particular, referring to FIG. 7 (*a*) and FIG. 7 (*b*), a photographable range A' corresponding to a case that the view angle of the lens 510 is 40 degrees is wider than a photographable range A corresponding to a case that the view angle of the lens 510 is 30 degrees. By the same principle, referring to FIG. 7 (*b*) and FIG. 7 (*c*), it can be observed that a photographable range A" corresponding to a case that the view angle of the lens 510 is 45 degrees is wider than a photographable range A' corresponding to a case that the view angle of the lens 510 is 40 degrees. Thus, as a distance (i.e., focal distance) between the lens 510 and the image pickup unit 520 decreases, if the view angle of the lens 510 increases, the photographable range of the camera 121 can increase.

Accordingly, if a focal distance is changed in order to focus on a specific subject, a size of the subject in a preview image outputted through the display unit 151 will be changed. In particular, as a focal distance is changed, a size of a subject in a preview image can be enlarged or reduced momentarily. Hence, a user can sense that the preview image fluctuates momentarily. And, fatigue of user's eyes may increase due to the momentary enlargement or reduction of the subject.

Therefore, the controller 180 can control a size of a subject in a preview image to be maintained at an equal same level despite that a focal distance is changed.

Figure 8:
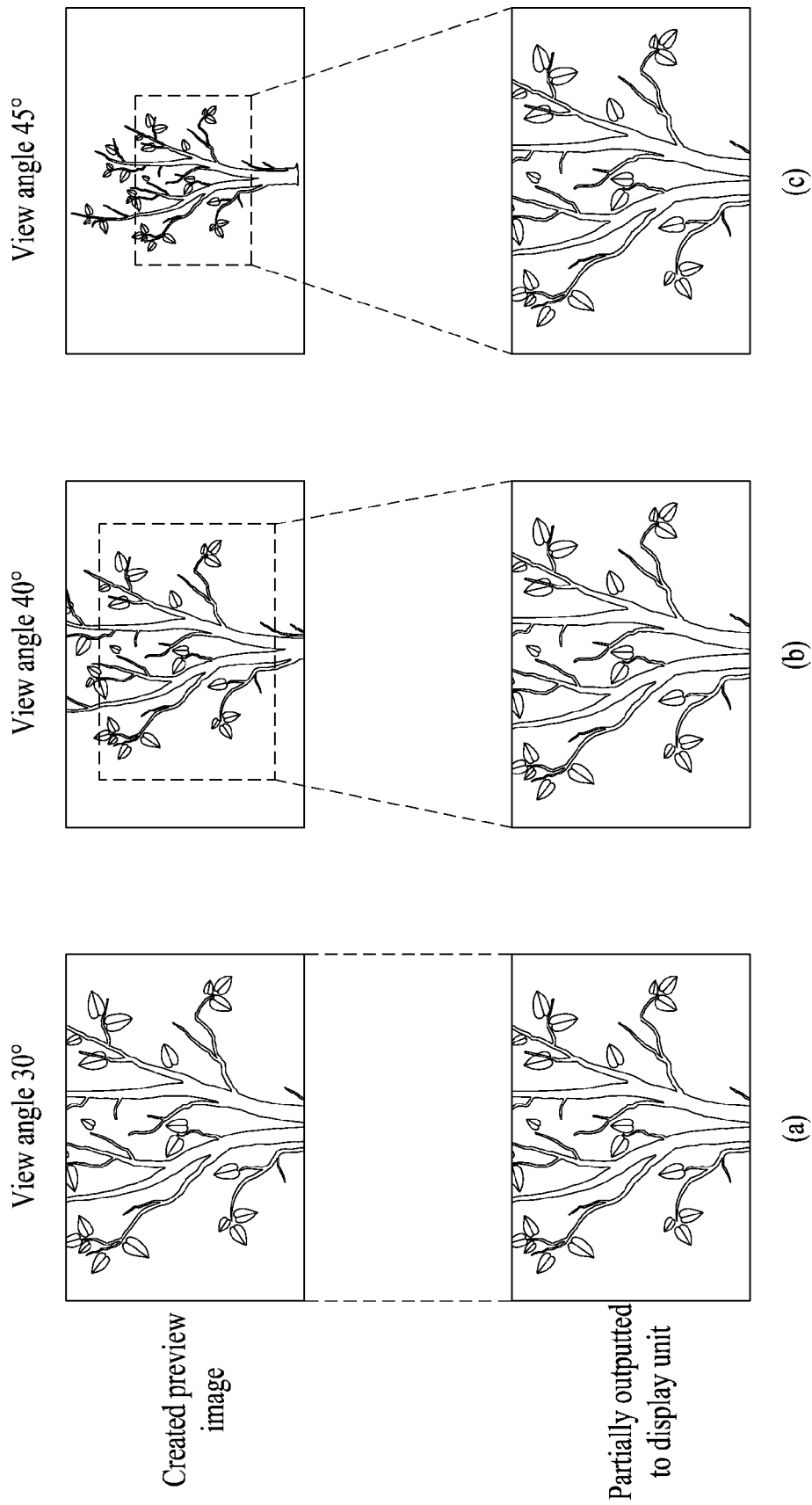
FIG. 8 is a diagram to describe one example of maintaining a size of a subject in a preview image on an equal level despite a change of a focal distance.

For instance, FIG. 8 is a diagram to describe one example of maintaining a size of a subject in a preview image on an equal level despite a change of a focal distance. If a view angle increases due to a change of a focal distance, a photographable range increases. In doing so, although a view angle of the lens 510 does not have a minimum value, the controller 180 can create a preview image to fit a photographable range A corresponding to the minimum value of the view angle of the lens 510. In particular, referring to FIG. 8 (*a*) and FIG. 8 (*b*), the controller 180 can create a preview image that targets a region remaining after excluding a space (i.e., an increment of a photographable range) newly included in a photographable range owning to an increased view angle despite failing to be a photographable space at a minimum view angle of the lens 510.

In the following description, a method of creating a preview image capable of maintaining an equal size of a subject in the preview image is described in detail with reference to FIGS. 9 to 11.

Figure 9:
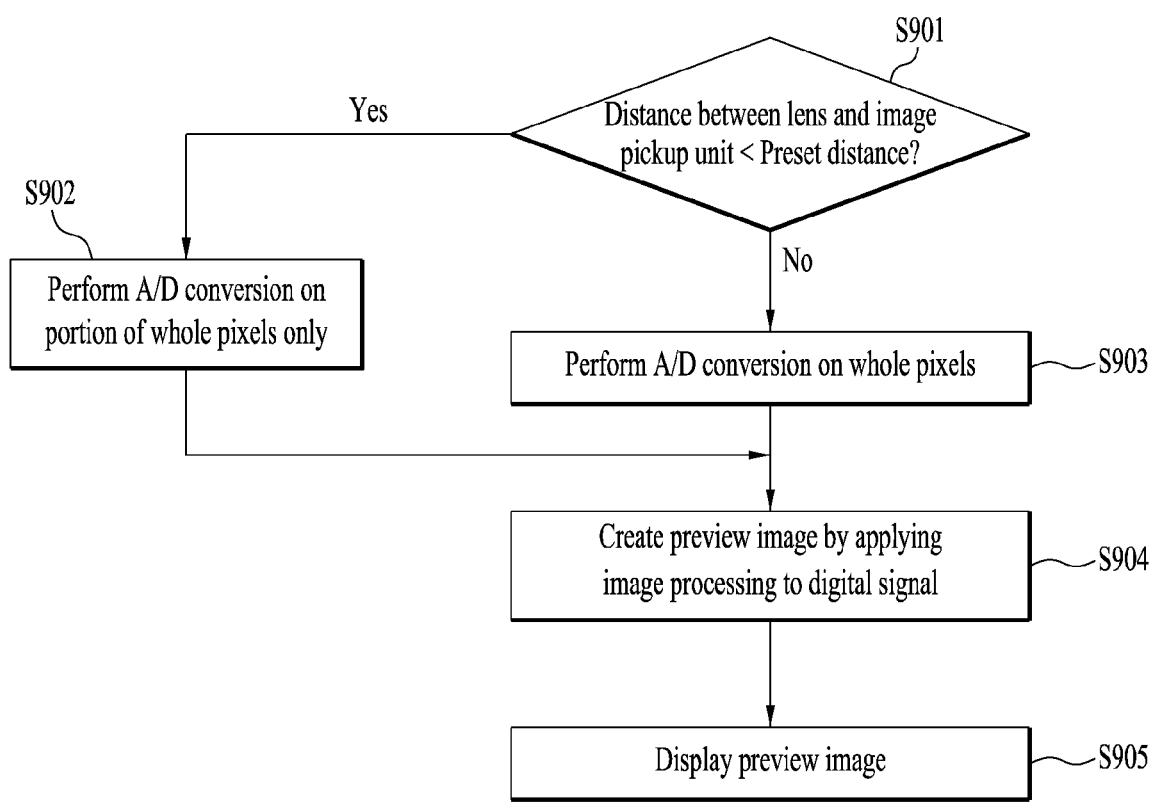
FIG. 9 is a flowchart for an operation of a mobile terminal according to one embodiment of the present invention.

FIG. 9 is a flowchart for an operation of a mobile terminal according to one embodiment of the present invention.

Referring to FIG. 9, the controller 180 can compare a distance (i.e., focal distance) between the lens 510 and the image pickup unit 520 to a preset distance [S901]. If the distance (i.e., focal distance) between the lens 510 and the image pickup unit 520 is shorter than the preset distance, as mentioned in the foregoing description with reference to FIG. 7, since a view angle of the lens may be greater than that of the case that the distance (i.e., focal distance) between the lens

510 and the image pickup unit 520 is set to maintain the preset distance, the image pickup unit 520 may be able to collect light from a wider space.

Hence, if the distance (i.e., focal distance) between the lens 510 and the image pickup unit 520 is shorter than the preset distance [S901], the controller 180 can control A/D (analog to digital) conversion to be performed only on pixels estimated as collecting light from a space that is estimated as collecting light in case that the distance (i.e., focal distance) between the lens 510 and the image pickup unit 520 is the preset distance [S902].

For instance, FIG. 10 is a diagram to describe one example that A/D conversion is performed only on a portion of a plurality of pixels. In particular, FIG. 10 (a) is a diagram for one example of an image formed in the image pickup unit 520 if a distance (i.e., focal distance) between the lens 510 and the image pickup unit 520 maintains a preset distance. And, FIG. 10 (b) is a diagram for one example of an image formed in the image pickup unit 520 if a distance (i.e., focal distance) between the lens 510 and the image pickup unit 520 is shorter than a preset distance.

In case that the distance (i.e., focal distance) between the lens 510 and the image pickup unit 520 is shorter than the preset distance, an image for a space, which is wider than that corresponding to a case that the distance (i.e., focal distance) between the lens 510 and the image pickup unit 520 maintains the preset distance, can be formed in the image pickup unit 520.

In this case, like the example shown in FIG. 10 (b), the controller 180 can control the digital conversion to be performed only on an analog signal for pixels estimated as collecting light from a space estimated as collecting light if the distance (i.e., focal distance) between the lens 510 and the image pickup unit 520 is the preset distance. In particular, like the example shown in FIG. 10 (b), the controller 180 can control the digital conversion to be performed on pixels corresponding to a space equal to that corresponding to a case that the distance (i.e., focal distance) between the lens 510 and the image pickup unit 520 is the preset distance. Thus, a digital processor provided to the image processor 550 may be created as targeting the equal space all the time.

On the contrary, if the distance (i.e., focal distance) between the lens 510 and the image pickup unit 520 is equal to or greater than the preset distance [S901], the controller 180 can control the A/D conversion to be performed on all pixels of the image pickup unit 520 [S903].

Subsequently, the image processor 550 can create a preview image by applying an image processing to the digital signal digitally converted by the image pickup unit 520 [S904]. Thereafter, the controller 180 can control the preview image to be outputted through the display unit 151 [S905].

Like the example shown in FIG. 10, by controlling the digital conversion to be performed only on the pixels that receive light from the space estimated to have an image formed therein if the distance between the lens 510 and the image pickup unit 520 maintains the preset distance, it is able to control the preview image to be created despite a change of a focal distance in a manner of targeting a space estimated as photographed if the distance between the lens 510 and the image pickup unit 520 maintains the preset distance. Hence, assuming that factors are not changed except that the focal distance is changed, a size of a subject in the preview image can maintain an equal level all the time despite that the focal distance is changed.

In the example shown in FIG. 9, if the distance between the lens 510 and the image pickup unit 520 is shorter than the preset distance, the size of the subject in the preview image can maintain an equal level by controlling the digital conversion to be performed only on a portion of the entire pixels of the image pickup unit 520. The mobile terminal according to the present invention controls a region, which is to be outputted through the display unit 151, in an image outputted from the image processor 550 to be adjusted in accordance with a focal distance, thereby controlling a size of a subject in the displayed preview image to maintain an equal level. This is described in detail with reference to FIG. 11 as follows.

Figure 11:
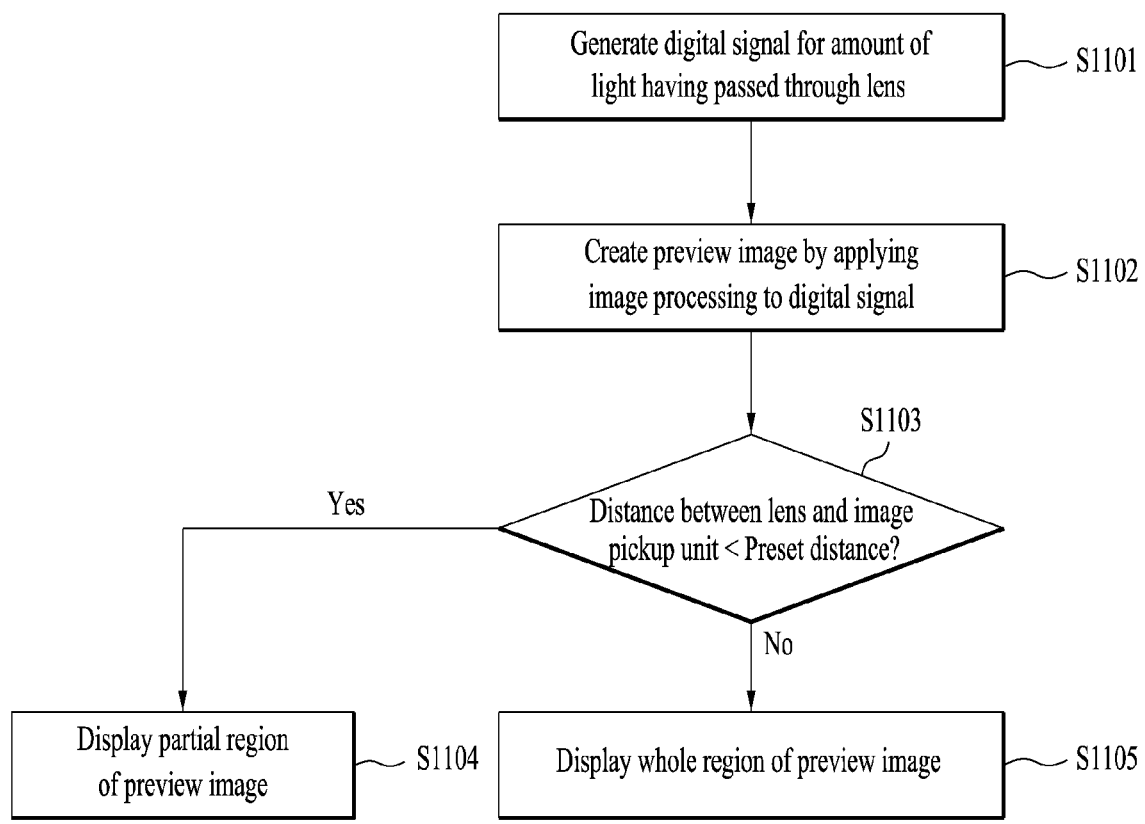
FIG. 11 is a flowchart for an operation of a mobile terminal according to one embodiment of the present invention.

FIG. 11 is a flowchart for an operation of a mobile terminal according to one embodiment of the present invention.

Referring to FIG. 11, the image pickup unit 520 is able to create a digital signal by digitally converting an analog data that passes through the lens 510 [S1101]. The image processor 550 is able to create a preview image by applying an image processing on the digital signal digitally converted from the image pickup unit 520 [S1102]. In doing so, if a distance between the lens 510 and the image pickup unit 520 is shorter than a preset distance [S1103], the controller 180 can control a portion of the preview image to be displayed in a manner of fitting a size of the display unit 151 [S1104]. In particular, the controller 180 is able to control a part, which corresponds to the preview image created when the distance between the lens 510 and the image pickup unit 520 is the preset distance, to be outputted through the display unit 151.

For instance, FIG. 12 is a diagram to describe one example of outputting a portion of a preview image through the display unit 151. In particular, FIG. 12 (a) shows one example of a preview image created when a distance between the lens 510 and the image pickup unit 520 maintains a preset distance. And, FIG. 12 (b) shows one example of a preview image created when a distance between the lens 510 and the image pickup unit 520 is shorter than a preset distance.

If the distance between the lens 510 and the image pickup unit 520 is shorter than the preset distance, a preview image created by the image processor 550 may targets a space wider than that of a preview image estimated as created when the distance between the lens 510 and the image pickup unit 520 maintains the preset image. Hence, like the example shown in FIG. 12 (b), if the distance between the lens 510 and the image pickup unit 520 is shorter than the preset distance, a part, which corresponds to the preview image estimated as created when the distance between the lens 510 and the image pickup unit 520 maintains the preset distance, in the preview image created by the image processor 550 to be outputted through the display unit 151.

On the contrary, if the distance between the lens 510 and the image pickup unit 520 is equal to or greater than the preset distance [S1103], the controller 180 can control a whole region of the preview image to be displayed through the display unit 151 [S105].

In the examples shown in FIG. 9 and FIG. 11, the preset distance between the lens 510 and the image pickup unit 520 may include a maximum spaced distance (i.e., a maximum focal distance). In this case, even if the distance between the lens 510 and the image pickup unit 520 is shorter than the maximum spaced distance, a size of a subject in the preview image outputted through the display unit 151 may be able to maintain a level equal to that when the distance between the lens 510 and the image pickup unit 520 is the maximum spaced distance. Hence, the size of the subject in the preview image can be maintained at the equal level irrespective of a focal distance change of the lens 510.

The present distance may be set shorter than the maximum spaced distance between the lens 510 and the image pickup unit 520. In this case, if the distance between the lens 510 and the image pickup unit 520 is decreased to the preset distance from the maximum spaced distance, a size of a subject in the preview image may increase more or less. Yet, as soon as the spaced distance between the lens 510 and the image pickup unit 520 gets shorter than the preset distance, the size of the subject in the preview image may be maintained at the equal level irrespective of the focal distance change of the lens 510.

As mentioned in the foregoing descriptions with reference to FIG. 9 and FIG. 11, the controller 180 digitally converts a portion of the entire pixels of the image pickup unit 520 or controls a portion of a preview image outputte4d from the image processor 550 to be displayed through the display unit 151 only, thereby controlling a size of a subject in the preview image to maintain an equal level. In doing so, based on the distance between the lens 510 and the image pickup unit 520, the controller 180 is able to determine a range of pixels to use or a range to display in a whole region of the preview image. In the following description, a method of determining an available range such as a range of pixels to use, a range to display in a whole region of a preview image and the like is explained in detail.

According to one embodiment of the present invention, the controller 180 is able to determine an available range based on a relative distance between the lens 510 and the image pickup unit 520. In particular, the controller 180 is able to determine an available range using an available rate mapped to a relative distance between the lens 510 and the image pickup unit 520. To this end, a lookup table of an available rate mapped to a relative distance between the lens 510 and the image pickup unit 520 may be saved in the memory 160.

Figure 13:
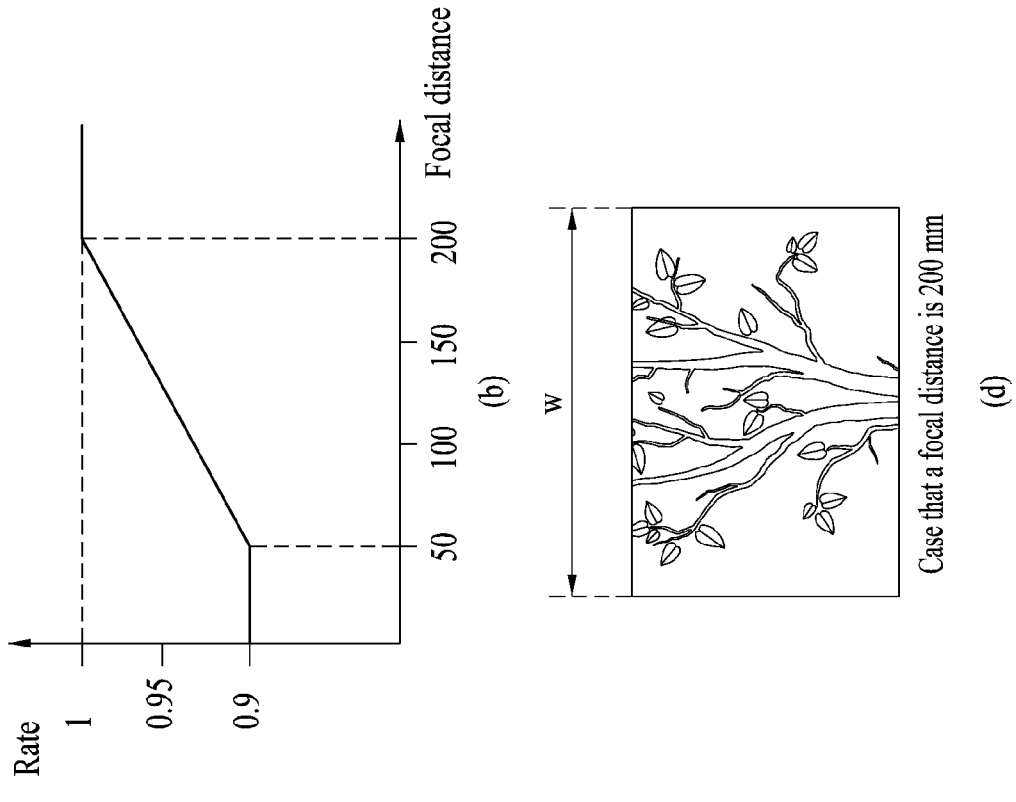
FIG. 13 is a diagram to describe one example of determining an available range using a lookup table.

For instance, FIG. 13 is a diagram to describe one example of determining an available range using a lookup table. In particular, FIG. 13 (a) is a diagram for one example of a lookup table and FIG. 13 (b) is a diagram of graph plotted using variables included in the lookup table. FIG. 13 (c) and FIG. 13 (d) are diagrams for examples of adjusting an available range using the lookup table.

Referring to the example shown in FIG. 13 (a), if a distance between the lens 510 and the image pickup unit 520 decreases gradually, an available range decreases gradually. For instance, in case that the distance between the lens 510 and the image pickup unit 520 is 50 mm, an available rate indicated by the lookup table is 0.9. Hence, the controller 180 designates 9/10 of the total pixel number as available pixels only. Alternatively, the controller 180 may be able to determine a size corresponding to 9/10 of a whole region of a preview image as a region to display. For instance, referring to the example shown in FIG. 13 (c), in a preview image having a horizontal length and a vertical length set to w and h, respectively, a region corresponding to 0.9 w and 0.9 h is designated as a displayable range.

For another instance, if a distance between the lens 510 and the image pickup unit 520 is 200 mm, an available rate indicated by the lookup table is 1. In this case, the controller 180 determines the entire pixels as available pixels. Alternatively, the controller 180 may be able to determine a whole region of a preview image as a region to display. For instance, in the example shown in FIG. 13 (d), a whole region of a preview image having a horizontal length set to w and a vertical length set to h is designated as a displayable range.

In the example shown in FIG. 13 (a), it is able to determine an available range using a lookup table having an available rate mapped to a distance between the lens 510 and the image pickup unit 520. In this case, if one of the lens 510 and the image pickup unit 520 is fixed and the other is movable along an optical axis (i.e., z-axis), it may be able to use a lookup table having an available range mapped to a moving distance between the lens 510 and the image pickup unit 520 instead of the distance between the lens 510 and the image pickup unit 520.

Moreover, if a z-axis direction connecting unit of the lens drive unit 530 or the image pickup unit drive unit 540 includes a piezoelectric device, a VCM or a VCA, it may be able to estimate a moving distance of the lens 510 or a moving distance of the image pickup unit 520 based on a current value applied to the z-axis direction connecting unit. Hence, it may be able to use a lookup table having an available rate mapped to a current value applied to the z-axis direction connecting unit of the lens drive unit 530 or the image pickup unit drive unit 540 instead of the distance between the lens 510 and the image pickup unit 520.

Yet, in case of the VCM configured to adjust a position of the lens 510 or the image pickup unit 520 using a magnetic substance, a current value applied to the z-axis direction connecting unit and a moving distance of the lens 510 or the image pickup unit 520 may not be fixedly mapped to each other due to the hysteresis property of the magnetic substance. Hence, the controller 180 may be able to determine an available range using a lookup table corresponding to a case that the distance between the lens 510 and the image pickup unit 520 increases or a lookup table corresponding to a case that the distance between the lens 510 and the image pickup unit 520 decreases.

Figure 14:
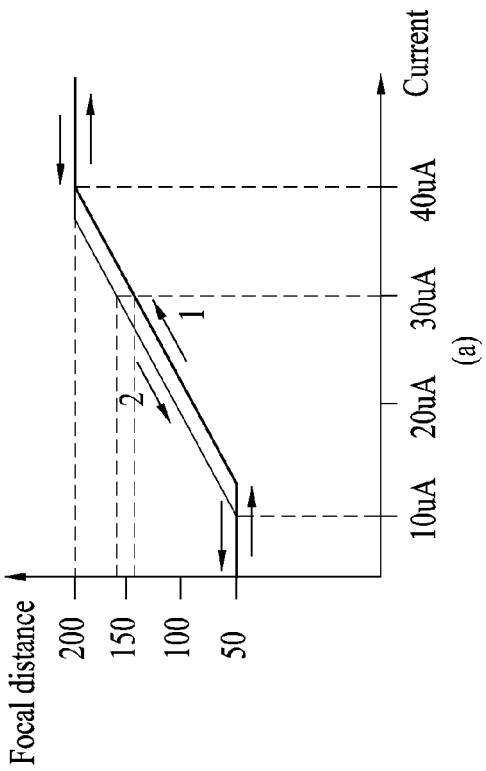
FIG. 14 is a diagram to describe one example of determining an available range if a Z-axis direction connecting unit includes VCM.

For instance, FIG. 14 is a diagram to describe one example of determining an available range if a Z-axis direction connecting unit includes VCM. FIG. 14 (a) is a graph of plotting a current value applied to a VCM and a distance between the lens 510 and the image pickup unit 520 corresponding to the current value. In FIG. 14 (a), a line #1 may be applied to a case that a distance between the lens 510 and the image pickup unit 520 increases gradually. And, a line #2 may be applied to a case that a distance between the lens 510 and the image pickup unit 520 decreases gradually. For instance, referring to FIG. 14 (a), although a current applied to the VCM is 30 μA, the distance between the lens 510 and the image pickup unit 520 may vary depending on whether the distance between the lens 510 and the image pickup unit 520 tends to increase or decrease. If the distance between the lens 510 and the image pickup unit 520 tends to increase (i.e., applying the line #1), when the current applied to the VCM is 30 μA, the distance between the lens 510 and the image pickup unit 520 may be smaller than 150 mm. On the contrary, if the distance between the lens 510 and the image pickup unit 520 tends to decrease (i.e., applying the line #2), when the current applied to the VCM is 30 μA, the distance between the lens 510 and the image pickup unit 520 may be greater than 150 mm.

In particular, in case that a z-axis direction connecting unit includes a VCM, a current value applied to the VCM may correspond to two distance values. Hence, the memory 160 of the mobile terminal according to the present invention stores a $1^{st}$ lookup table applicable to a case that a distance between the lens 510 and the image pickup unit 520 tends to increase and a $2^{nd}$ lookup table applicable to a case that a distance between the lens 510 and the image pickup unit 520 tends to decrease. And, the controller 180 is able to determine an available range using one of the $1^{st}$ lookup table and the $2^{nd}$ lookup table.

For instance, when a distance between the lens 510 and the image pickup unit 520 tends to increase, if a current value applied to a VCM is 12 μA, the controller 180 may be able to apply 0.9 as a value of an available rate by applying the $1^{st}$ lookup table shown in FIG. 14 (b). On the other hand, when a distance between the lens 510 and the image pickup unit 520 tends to decrease, if a current value applied to a VCM is 12

μA, the controller 180 may be able to apply 0.92 as a value of an available rate by applying the $2^{nd}$ lookup table shown in FIG. 14 (c).

While a distance between the lens 510 and the image pickup unit 520 is changing, if an optical axis is fixed all the time, the controller 180 may be able to apply an available rate by taking a center point of the image pickup unit 520 or a center point of a preview image as a reference.

Figure 15:
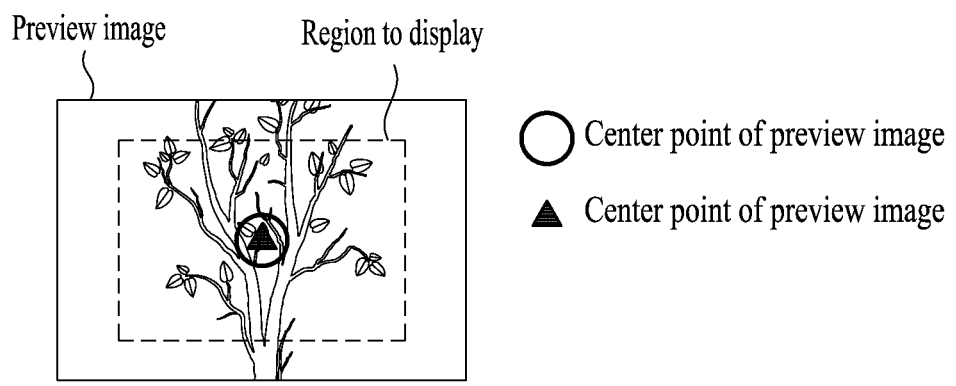
FIG. 15 is a diagram to describe one example of determining an available range if an optical axis is fixed.

For instance, if an available rate to apply is 0.9, like the example shown in FIG. 15, the controller 180 can control a center point of a preview image having a horizontal length set to w and a vertical length set to h to coincide with a center point of a region to display in a size of 0.9 w and 0.9 h. Yet, while the distance between the lens 510 and the image pickup unit 520 is changing, if the optical axis is changed, a position of a subject in a preview image may be changed momentarily. For instance, while the distance between the lens 510 and the image pickup unit 520 is changing, if destabilization of the mobile terminal is detected, the controller 180 can move or rotate the lens 510 or the image pickup unit 520 in a direction opposite to that of the destabilization. This may cause an effect that a position of a subject in a preview image is changed momentarily. For instance, FIG. 16 is a diagram for one example of momentarily changing a position of a subject in a preview image in response to a change of an optical axis. Like the example shown in FIG. 16, as a position of a subject is changed momentarily, a user can sense that a preview image fluctuates momentarily or fatigue of user's eyes may increase due to the momentary movement of the subject. Therefore, if an optical axis is changed while a focal distance between the lens 510 and the image pickup unit 520 is changed, the controller 180 can control a position of an available region to be changed by a displacement of the optical axis.

Figure 17A:
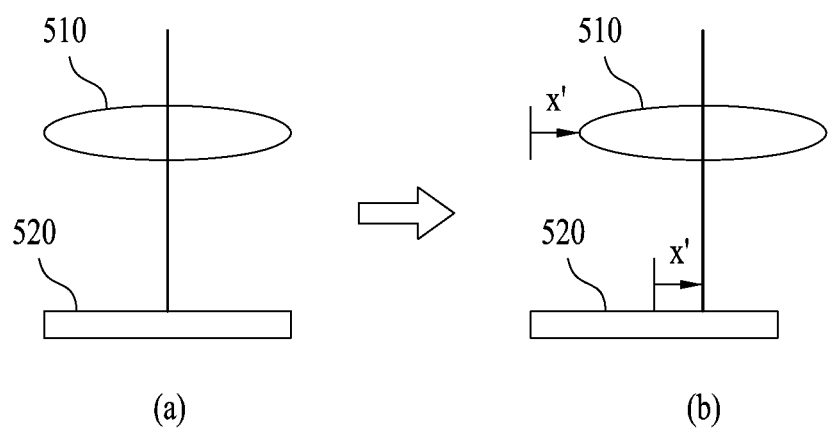
FIG. 17A and FIG. 17B are diagrams for one example of changing a position of an available region amounting to a displacement of an optical axis.
Figure 17B:
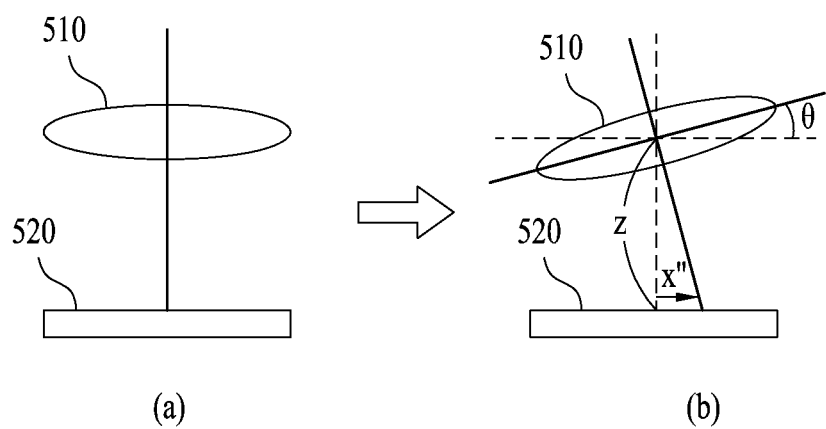

For instance, FIG. 17A and FIG. 17B are diagrams for one example of changing a position of an available region amounting to a displacement of an optical axis. If destabilization of the mobile terminal is detected, the controller 180 can correct an image distortion due to the destabilization of the mobile terminal in a manner of moving the lens 510 or the image pickup unit 520 along x-axis or y-axis or rotating the lens 510 or the image pickup unit 520 centering on the x- or y-axis. For instance, like the example shown in FIG. 17A, if the lens 510 is moved by x' along x-axis, an optical axis can be changed by x' in response to the movement of the lens 510. Moreover, like the example shown in FIG. 17B, if the lens 510 is rotated by θ centering on y-axis, an optical axis can be changed by x" along x-axis. In this case, assuming that a shortest distance (i.e., a focal distance) between a center of the lens 510 and the image pickup unit 520 is set to z, such a relation as 'x"=z tan θ can be established.

Hence, if the lens 510 is moved by x' along x-axis or rotated by θ centering on y-axis, an optical axis can be changed by Δx (=x'+x"(=z tan θ)). Moreover, if the lens 510 is moved by y' along y-axis or rotated by θ' centering on x-axis, an optical axis can be changed by Δy (=y'+y"(=z tan θ')) [not shown in the drawing].

Figure 18A:
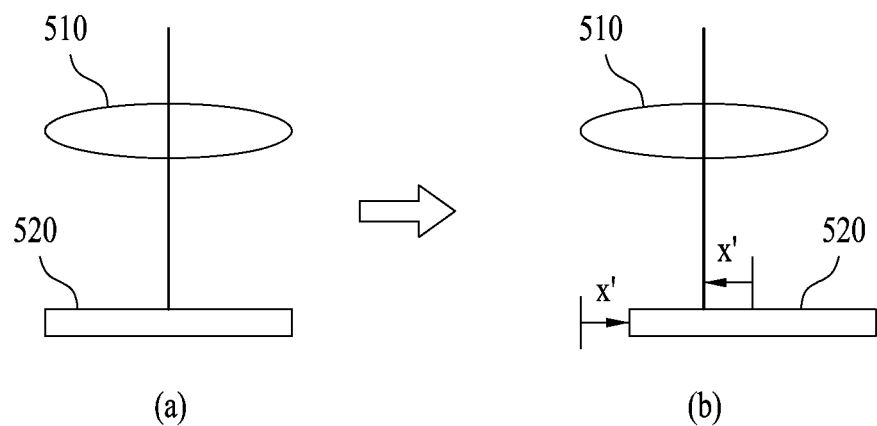
FIG. 18A and FIG. 18B are diagrams for one example of changing an optical axis in response to a movement of an image pickup unit 520.
Figure 18B:
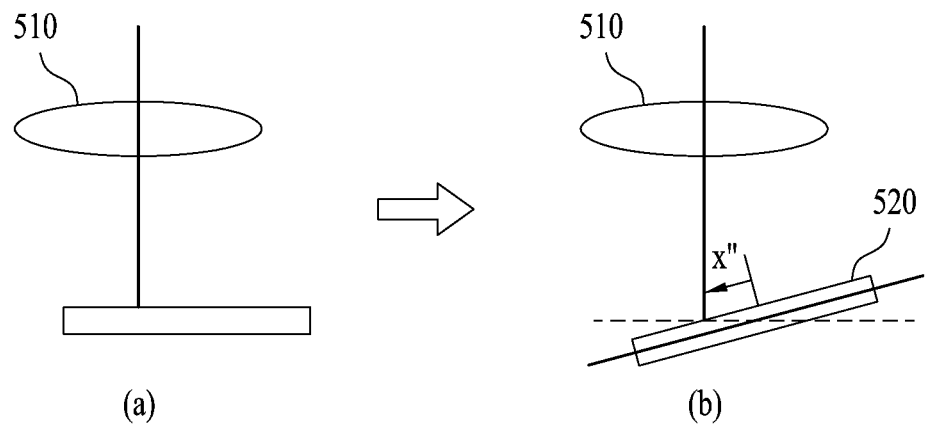

In case that the image pickup unit 520 is moved instead of the lens 510, an optical axis can be changed. For instance, FIG. 18A and FIG. 18B are diagrams for one example of changing an optical axis in response to a movement of an image pickup unit 520. If the image pickup unit 520 is moved by x' along x-axis, an optical axis can be moved by −x' in response to the movement of the image pickup unit 520. Moreover, like the example shown in FIG. 18B, if the image pickup unit 520 is rotated by θ centering on y-axis, an optical axis can be moved by −x" in response to the rotation of the image pickup unit 520. Hence, if the image pickup unit 520 is moved by x' along the x-axis or rotated by θ centering on the y-axis, the optical axis may be changed by Δx'(=−x'−x"). On the other hand, if the image pickup unit 520 is moved by y' along the y-axis or rotated by θ' centering on the x-axis, the optical axis may be moved by Δy'(=−y'−y"). When the image pickup unit 520 is rotated centering on the x-axis or the y-axis, if a displacement of the optical axis is negligibly small, it can be approximated into a displacement (Δx'=−x') of the optical axis for the x-axis or a displacement (Δy=−y') of the optical axis for the y-axis.

If a position of an optical axis is changed by a movement or motion of the lens 510 or the image pickup unit 520, the controller 180 can change a position of an available region by a displacement of the moved optical axis.

For instance, FIG. 19 is a diagram for one example of changing a position of a region desired to be displayed in a preview image in response to a change of an optical axis. In the example shown in FIG. 19, when a view angle of the lens 510 is increased to 45 degrees from 40 decreases, an optical axis is changed. Hence, the controller 180 can control a position of a displayable region, which is desired to display, to be moved by a displacement of the optical axis. By changing a center point of the displayable region by a changed (or displaced) portion of the optical axis, the controller 180 can control a subject in a preview image to be displayed at the same position all the time despite that a position of the optical axis is changed momentarily.

In the lookup tables shown in FIG. 13 and FIG. 14, a distance between the lens 510 and the image pickup unit 520 and an available rate are mapped to each other. For another example, the controller 180 may be able to determine an available range based on a lookup table in which a distance between the lens 510 and the image pickup unit 520 is mapped to coordinates of an available range.

For instance, FIG. 20 is a diagram to describe one example of determining an available range using a lookup table. In particular, FIG. 20 (a) is a diagram for one example of a lookup table. FIG. 20 (b) and FIG. 20 (c) are diagrams for examples of determining an available range using a lookup table.

In the example shown in FIG. 20 (a), when a focal distance of the lens 510 is 50 mm, coordinates of an available range include (x1, y1) and (x'1, y'1). Like the example shown in FIG. 20 (b), the controller 180 can determine a rectangle, of which vertexes include two points [(x1, y1), (x'1, y'1)] of the coordinates of the available range in a preview image, as a range to display.

For another example, when a focal distance of the lens 510 is 190 mm, coordinates of an available range include (x4, y4) and (x'4, y'4). Like the example shown in FIG. 20 (c), the controller 180 can determine a rectangle, of which vertexes include two points [(x4, y4), (x'4, y'4)] of the coordinates of the available range in a preview image, as a range to display.

In this case, if the coordinates of the optical axis are changed by the movement of the lens 510 or the image pickup unit 520, the controller 180 can control the coordinates of the available range to be changed in response to the change of the optical axis. For instance, when a focal distance of the lens 510 is 50 mm, if the optical axis is moved by Δx on x-axis and by Δy on y-axis, the coordinates of the available range can be changed into (x1+Δx, y1+Δy) and (x'1+Δx, y'1+Δy).

In the example shown in FIG. 20 (a), it is able to use the lookup table in which a focal distance is mapped to two coordinates of an available range. For another example, the controller 180 is able to use a lookup table in which a focal distance is mapped to four coordinates of an available range.

Figure 21:
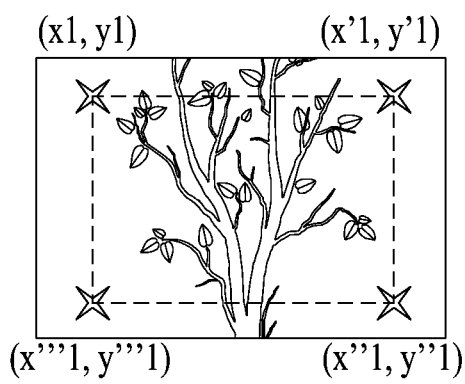
FIG. 21 is a diagram to describe another example of determining an available range using a lookup table.

For instance, FIG. 21 is a diagram to describe another example of determining an available range using a lookup table. In particular, FIG. 21 (a) is a diagram for one example of a lookup table and FIG. 21 (b) is a diagram for one example of determining an available range using a lookup table.

In the example shown in FIG. 21 (a), when a focal distance of the lens 510 is 50 mm, coordinates of an available range include (x1, y1), (x'1, y'1), (x"1, y"1), and (x'"1, y'"1). Like the example shown in FIG. 21 (b), the controller 180 can determine a rectangle, of which vertexes include four points of the coordinates of the available range in a preview image, as a range to display.

In this case, if the coordinates of the optical axis are changed by the movement of the lens 510 or the image pickup unit 520, the controller 180 can control the coordinates of the available range to be changed in response to the change of the optical axis. For instance, when a focal distance of the lens 510 is 50 mm, if the optical axis is moved by Δx on x-axis and by Δy on y-axis, the coordinates of the available range can be changed into (x1+Δx, y1+Δy), (x'1+Δx, y'1+Δy), (x"1+Δx, y"1+Δy), and (x'"1+Δx, y'"1+Δy) as well.

As mentioned in the above description with reference to FIG. 21, in case that an available range is determined using 4 coordinates, it is able to cope with a rolling shutter problem more flexibly. This is described in detail with reference to FIG. 22 as follows.

Figure 22:
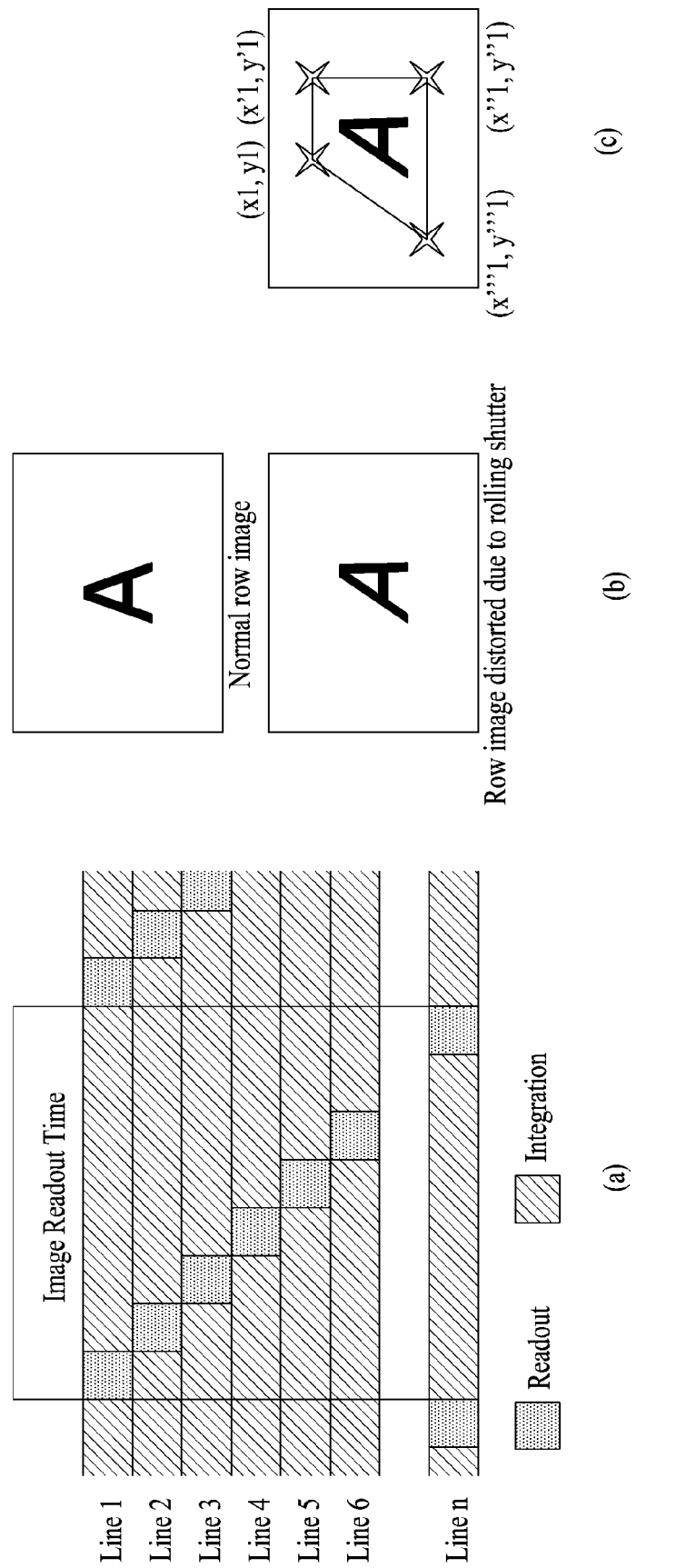

FIG. 22 is a diagram for one example to describe a rolling shutter generated from CMOS or the like.

Referring to FIG. 22, a CMOS consisting of n pixel arrays performs an operation by reading out photosensitive data in order from the n pixel arrays (Line 1 to Line n). In particular, since a readout timing of capturing an image and an integration timing of combining the captured images are different per array, in case that an image processing is performed on a digital signal converted in the CMOS, referring to FIG. 22 (b), a subject in a preview image may have a skew shape.

When the subject in the preview image has the skew shape, referring to FIG. 22 (c), if 4 coordinates are configured to form a trapezoid and a length of a short one of a top side and a bottom side is extended to fit a length of the long one of the top side and the bottom side, distortion of the subject in the preview image can be minimized.

In the examples shown in FIG. 20 and FIG. 21, two or four coordinates are mapped to a focal distance. Of course, it is able to use a lookup table in which at least four or more coordinates are mapped to a focal distance. For instance, if distortion of an image sensitized through the lens 510 increases, the number of coordinates for designating an available range can be incremented.

Accordingly, embodiments of the present invention provide various effects and/or features.

According to at least one of embodiments of the present invention, fluctuation of a screen can be reduced.

According to at least one of embodiments of the present invention, a size of a subject in an image displayed on a display unit can be equally maintained all the time irrespective of a change of a view angle of a lens.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a lens;
   a lens drive unit configured to move the lens along an x-axis and y-axis which are vertical to an optical axis and a z-axis which is parallel to the optical axis or to rotate the lens centering on the x-axis and the y-axis;
   an image pickup unit configured to generate a digital signal by detecting a light having passed through the lens;
   an image processor configured to create a preview image by applying an image processing to the digital signal;
   a display unit configured to display the preview image;
   a memory configured to store a lookup table having a display rate mapped to a distance between the lens and the image pickup unit; and
   a controller, if the distance between the lens and the image pickup unit is shorter than a preset distance, controlling a partial region of the preview image to be outputted through the display unit,
   wherein if the lens is moved along at least one of the x-axis and the y-axis or rotated centering on at least one of the x-axis and the y-axis, the controller controls a position of the partial region in the preview image to be changed by a displacement of the optical axis attributed to the movement of the lens, and
   wherein the controller determines the partial region in the preview image based on the display rate mapped to the distance between the lens and the image pickup unit.

2. The mobile terminal of claim 1, further comprising a sensing unit configured to sense a destabilization of the mobile terminal, wherein the controller controls the lens drive unit to move or rotate the lens in a direction opposite to that of the destabilization of the mobile terminal.

3. The mobile terminal of one of claim 1, wherein the lookup table comprises a $1^{st}$ lookup table and a $2^{nd}$ lookup table, wherein if the distance between the lens and the image pickup unit tends to increase, the controller determines the partial region using the $1^{st}$ lookup table, and wherein if the distance between the lens and the image pickup unit tends to decrease, the controller determines the partial region using the $2^{nd}$ lookup table.

4. The mobile terminal of claim 1, wherein the lens drive unit comprises at least one of VCM and VCA for adjusting a focal distance of the lens.

5. A mobile terminal comprising:
   a lens:
   a lens drive unit configured to move the lens along an x-axis and y-axis which are vertical to an optical axis and a z-axis which is parallel to the optical axis or to rotate the lens centering on the x-axis and the y-axis;
   an image pickup unit configured to generate a digital signal by detecting a light having passed through the lens;
   an image processor configured to create a preview image by applying an image processing to the digital signal;
   a display unit configured to display the preview image;

a memory configured to store a lookup table of mapping a distance between the lens and the image pickup unit to coordinates of a displayable region to display, a controller, if the distance between the lens and the image pickup unit is shorter than a preset distance, controlling a partial region of the preview image to be outputted through the display unit, wherein if the lens is moved along at least one of the x-axis and the y-axis or rotated centering on at least one of the x-axis and the y-axis, the controller controls a position of the partial region in the preview image to be changed by a displacement of the optical axis attributed to the movement of the lens, and wherein the controller determines the partial region in the preview image based on the coordinates of the displayable region mapped to the distance between the lens and the image pickup unit.

6. The mobile terminal of claim 5, wherein if there are two coordinates mapped to the distance between the lens and the image pickup unit, the controller determines a rectangle having the two coordinates configuring a diagonal line in the preview image as the partial region.

7. The mobile terminal of claim 5, wherein if there are four coordinates mapped to the distance between the lens and the image pickup unit, the controller determines a rectangle having vertexes set to the four coordinates in the preview image as the partial region.

8. A mobile terminal comprising:

a lens:

a lens drive unit configured to move the lens along an x-axis and y-axis which are vertical to an optical axis and a z-axis which is parallel to the optical axis or to rotate the lens centering on the x-axis and the y-axis;

an image pickup unit configured to generate a digital signal by detecting a light having passed through the lens;

an image processor configured to create a preview image by applying an image processing to the digital signal;

a display unit configured to display the preview image; and a controller, if a distance between the lens and the image pickup unit is shorter than a preset distance, controlling a partial region of the preview image to be outputted through the display unit, wherein if the lens is moved along at least one of the x-axis and the y-axis or rotated centering on at least one of the x-axis and the y-axis, the controller controls a position of the partial region in the preview image to be changed by a displacement of the optical axis attributed to the movement of the lens, and wherein a displacement $\Delta x$ of the optical axis for the x-axis is $\Delta x = x' + x''$ (where, $x'' = z \tan \theta$, the $x'$ is a moving distance of the lens along the x-axis, the z is a shortest distance to the image pickup unit from a center of the lens, and the $\theta$ is a rotation angle of the lens rotated centering on the y-axis) and wherein a displacement $\Delta y$ of the optical axis for the y-axis is $\Delta y = y' + y''$ (where, $y'' = z \tan \theta'$, the $y'$ is a moving distance of the lens along the y-axis, the z is the shortest distance to the image pickup unit from the center of the lens, and the $\theta'$ is a rotation angle of the lens rotated centering on the x-axis).

9. A mobile terminal comprising:

a lens;

an image pickup unit configured to generate a digital signal by detecting a light having passed through the lens;

an image pickup unit drive unit configured to move the image pickup unit along an x-axis and y-axis which are vertical to an optical axis and a z-axis which is parallel to the optical axis or to rotate the image pickup unit centering on the x-axis and the y-axis;

an image processor configured to create a preview image by applying an image processing to the digital signal;

a display unit configured to display the preview image;

a memory configured to store a lookup table having a display rate mapped to a distance between the lens and the image pickup unit; and a controller, if the distance between the lens and the image pickup unit is shorter than a preset distance, controlling a partial region of the preview image to be outputted through the display unit, wherein if the image pickup unit is moved along at least one of the x-axis and the y-axis or rotated centering on at least one of the x-axis and the y-axis, the controller controls a position of the partial region in the preview image to be changed by a displacement of the optical axis attributed to the movement of the image pickup unit, and wherein the controller determines the partial region in the preview image based on the display rate mapped to the distance between the lens and the image pickup unit.

10. A method of controlling a mobile terminal, comprising the steps of:

generating a digital signal for an amount of a light having passed through a lens;

creating a preview image by applying an image processing to the digital signal;

storing a lookup table having a display rate mapped to a distance between the lens and an image pickup unit; and displaying a partial region of the preview image when a distance between the lens and the image pickup unit is shorter than a preset distance, wherein if the lens is moved along at least one of an x-axis and a y-axis or rotated centering on at least one of the x-axis and the y-axis, the method further comprises changing a position of the partial region in the preview image by a displacement of the optical axis attributed to the movement of the lens, and wherein the method further comprises determining the partial region in the preview image based on the display rate mapped to the distance between the lens and the image pickup unit.

11. A method of controlling a mobile terminal, comprising the steps of:

generating a digital signal for an amount of a light having passed through a lens;

creating a preview image by applying an image processing to the digital signal;

storing a lookup table having a display rate mapped to a distance between the lens and an image pickup unit; and displaying a partial region of the preview image when if a distance between the lens and the image pickup unit is shorter than a preset distance, wherein if the image pickup unit is moved along at least one of an x-axis and a y-axis or rotated centering on at least one of the x-axis and the y-axis, the method further comprises changing a position of the partial region in the preview image by a displacement of the optical axis attributed to the movement of the image pickup unit, and wherein the method further comprises determining the partial region in the preview image based on the display rate mapped to the distance between the lens and the image pickup unit.

* * * * *